United States Patent
Sodeyama et al.

(10) Patent No.: US 6,453,803 B1
(45) Date of Patent: Sep. 24, 2002

(54) SOFT ICE CREAM MANUFACTURE METHOD THEREOF AND SOFT ICE CREAM MANUFACTURE APPARATUS

(75) Inventors: Takuya Sodeyama, Nagano (JP); Sumio Uehara, Nagano (JP); Junichi Nakasato, Nagano (JP); Tsuyoshi Kurosawa, Gunma (JP); Shigeru Togashi, Gunma (JP); Kazuto Matsuda, Gunma (JP); Mamoru Ittetsu, Tochigi (JP); Mitsuyoshi Nakamura, Gunma (JP); Naoto Kitazume, Gunma (JP); Shigeo Sato, Gunma (JP)

(73) Assignees: Sanyo Electric., Ltd., Osaka (JP); Sumi Corporation Co., Ltd., Nagano (JP)

( * ) Notice: Subject to any disclaimer, the term of this patent is extended or adjusted under 35 U.S.C. 154(b) by 0 days.

(21) Appl. No.: 09/647,685
(22) PCT Filed: Mar. 30, 1999
(86) PCT No.: PCT/JP99/01639
   § 371 (c)(1),
   (2), (4) Date: Sep. 29, 2000
(87) PCT Pub. No.: WO99/49739
   PCT Pub. Date: Jul. 10, 1999

(30) Foreign Application Priority Data

Mar. 31, 1998 (JP) .......................... 10/086430
Mar. 5, 1999 (JP) .......................... 11/058319

(51) Int. Cl.⁷ .......................... A23G 9/20; A23G 9/24; A23G 9/28
(52) U.S. Cl. .......................... 99/348; 99/353; 99/455; 366/149; 366/181.8; 366/191; 222/145.3; 222/146.6; 222/95
(58) Field of Search .......................... 99/348, 353, 355, 99/357, 452, 453, 455; 366/181.6, 182.1, 191, 320, 192, 183.1, 181.8, 149; 222/144.5, 145.3, 146.6, 92, 95

(56) References Cited

U.S. PATENT DOCUMENTS

| 3,945,614 A | * | 3/1976 | Suzuki et al. ............ 366/181.6 |
| 5,421,484 A | * | 6/1995 | Beach ..................... 222/95 |
| 5,620,115 A | * | 4/1997 | McGill .................... 222/95 |
| 5,775,533 A | * | 7/1998 | Schroeder ................. 222/95 |

FOREIGN PATENT DOCUMENTS

| JP | 49-124272 | 11/1974 |
| JP | 2-127180 | 10/1990 |
| JP | 8-056581 | 3/1996 |
| JP | 9-172977 | 7/1997 |

* cited by examiner

Primary Examiner—Reginald L. Alexander
(74) Attorney, Agent, or Firm—Darby & Darby

(57) ABSTRACT

There is provided a soft ice cream in which even materials such as a strawberry easily changed in properties and containing an acid component can be used, and the unique flavor of the material other than a soft ice cream mix, such as strawberry jam and chocolate, can sufficiently be enjoyed. In the soft ice cream obtained by charging the cream flow of a cooled and semi-hardened soft ice cream mix discharged from a discharge nozzle into a cup so that the discharge shape is maintained as much as possible, the part formed of the strawberry jam is continuously disposed in the part formed of the soft ice cream mix along the cream flow charged into the cup.

13 Claims, 19 Drawing Sheets

SOFT ICE CREAM MANUFACTURE METHOD THEREOF AND SOFT ICE CREAM MANUFACTURE APPARATUS

TECHNICAL FIELD

The present invention relates to a soft ice cream, a manufacture method thereof and a soft ice cream manufacture apparatus, further specifically to a soft ice cream obtained by charging a cream flow of a cooled and semi-hardened soft ice cream mix discharged from a discharge nozzle into a cup so that the discharge shape is maintained as much as possible, a manufacture method thereof, and a soft ice cream manufacture apparatus.

BACKGROUND ART

A soft cream charged into a corn cup is usually manufactured by a soft ice cream freezer shown in FIG. 9. In the soft ice cream freezer shown in FIG. 9, disposed are mix tanks 10a, 10b for containing a liquid soft ice cream mix, and a cooling chamber 14 provided with a stirrer 12 for stirring, cooling and semi-hardening the liquid soft ice cream mix.

A passage to an adapter 18 provided with a discharge nozzle from an exit hole 16 formed in the wall surface of the cooling chamber 14 is a passage through which the semi-hardened soft ice cream mix passes. A plunger 22 which vertically moves with the vertical movement of a lever 20 is disposed midway in the passage.

The plunger 22 is, as shown in FIGS. 10(a), (b), inserted into an insertion hole 30 formed in a soft ice cream freezer main body 24 so that vertical movement is possible. In the insertion hole 30, the exit hole 16 is opened in the inner wall surface, and the adapter 18 provided with a discharge nozzle 26 is screwed to the lower end.

Additionally, an O ring 28 is attached to the plunger 22 to realize a complete seal between the plunger 22 and the insertion hole 30.

When the lever 20 is moved to place this plunger 22 to the lowermost position, as shown in FIG. 10(a), the tapered end surface of the plunger 22 abuts on the end surface of the adapter 18 screwed to the soft ice cream freezer main body 24, and the soft ice cream mix passage leading to the discharge nozzle 26 from the exit hole 16 is closed.

On the other hand, when the lever 20 is moved to move the plunger 22 upward, as shown in FIG. 10(b), the tapered end surface of the plunger 22 is detached from the end surface of the adapter 18, and the soft ice cream mix passage is opened. Therefore, the semi-hardened soft ice cream mix cooled by the cooling chamber 14 flows in a direction of arrow A from the exit hole 16, and is discharged from the discharge nozzle 26 of the adapter 18. The discharge amount of the semi-hardened soft ice cream mix can be adjusted by adjusting the upward movement distance of the plunger 22.

The soft ice cream can be obtained by charging the cream flow discharged from the discharge nozzle to the cup so that the discharge shape is maintained as much as possible.

Additionally, the conventional soft ice cream is obtained from a single soft ice cream mix, and it has been desired that brightness be added to appearance and complicated flavor be added.

Therefore, after storing the liquid soft ice cream mixes of different components into the mix tanks 10a, 10b, using, for example, the soft ice cream mix with chocolate added thereto as one of the soft ice cream mixes, and cooling and semi-freezing the respective soft ice cream mixes individually, both soft ice cream mix flows are combined and discharged immediately before the soft ice cream mix is discharged from the discharge nozzle 26. The discharged cream flow is a two-color cream flow formed, for example, of a cream color part and a chocolate color part.

The soft ice cream obtained by charging the two-color cream flow discharged from the discharge nozzle 26 into the cup is bright in appearance and its complicated flavor can be tasted as compared with a single-color soft ice cream.

However, the liquid soft ice cream mixes stored in the mix tanks 10a, 10b are periodically subjected to heating for sterilization, and the like.

Therefore, the additive to be added to the soft ice cream mix needs to be unchanged in properties by heating, and the materials such as a strawberry which are easily changed in properties by heating and poor in heat resistance cannot be added. Furthermore, even the fruits that are not easily changed in properties by heating contain acid components in many cases. Therefore, when the soft ice cream mix as a dairy product is mixed with the fruit, the added fruit is separated from a milk content in some cases.

Therefore, for example, when strawberry-like flavor and color are to be added to the soft ice cream, a synthetic additive provided with the strawberry-like flavor and color, containing no acid component and having heat resistance is added to the soft ice cream mix. The soft ice cream obtained by adding the synthetic additive to the soft ice cream mix is poor in fresh strawberry-like flavor.

Furthermore, in a method of adding the additives such as chocolate to the liquid soft ice cream mix stored in one of the mix tanks 10a, 10b, and adding a pattern to the obtained soft ice cream, the pattern added to the soft ice cream is constant, and it is difficult to arbitrarily change the pattern. Additionally, the unique flavor owned by the additives such as chocolate is diluted by the soft ice cream mix.

Therefore, an object of the present invention is to provide a soft ice cream in which even the materials such as a strawberry easily changed in properties by heating and containing acid components can be used, and the unique flavor owned by the materials such as strawberry jam and chocolate other than a soft ice cream mix can sufficiently be enjoyed, a manufacture method thereof, and a soft ice cream manufacture apparatus which can manufacture the soft ice cream.

DISCLOSURE OF THE INVENTION

The present inventors have considered that in order to solve the problem, it is effective to continuously or intermittently add fluid materials such as strawberry jam to a semi-hardened soft ice cream mix flow immediately before the mix is discharged from a discharge nozzle or while the mix passes through the discharge nozzle, have conducted studies, and have reached the present invention as a result.

Specifically, according to the present invention, there is provided a soft ice cream obtained by charging a cream flow of a cooled and semi-hardened soft ice cream mix discharged from a discharge nozzle into a cup so that the discharge shape is maintained as much as possible, and a fluid material substantially containing no soft ice cream mix and exhibiting fluidity to the same degree as that of the semi-hardened soft ice cream mix is continuously or intermittently disposed along the cream flow charged to the cup.

Moreover, according to the present invention, there is provided a soft ice cream manufacture method of charging a cream flow of a cooled and semi-hardened soft ice cream mix discharged from a discharge nozzle into a cup so that a discharge shape is maintained as much as possible to manufacture a soft ice cream, and a fluid material substantially containing no soft ice cream mix and exhibiting fluidity to the same degree as that of the semi-frozen soft ice cream mix is continuously or intermittently added to the soft ice cream mix flow passing immediately before the discharge nozzle or through the discharge nozzle.

Furthermore, according to the present invention, there is provided a soft ice cream manufacture apparatus for charging a cream flow of a cooled and semi-hardened soft ice cream mix discharged from a discharge nozzle into a cup so that a discharge shape is maintained as much as possible, and the soft ice cream manufacture apparatus includes: a plunger, disposed in a passage which is provided with the discharge nozzle in one end and through which the semi-hardened soft ice cream mix passes, for attaching/detaching a tip end surface with respect to the discharge nozzle to open/close the passage; and an adding device for continuously or intermittently adding a fluid material substantially containing no soft ice cream mix and exhibiting fluidity to the same degree as that of the semi-hardened soft ice cream mix to the soft ice cream mix flow passing immediately before the discharge nozzle or through the discharge nozzle.

Additionally, "substantially containing no soft ice cream mix" mentioned in the present invention means that the soft ice cream mix is not positively added to the fluid material, and sucrose and/or solid milk content as a soft ice cream mix component may be contained.

According to the present invention, since the fluid materials such as strawberry jam substantially containing no soft ice cream mix are continuously or intermittently added to the semi-hardened soft ice cream mix flow passing immediately before the discharge nozzle or through the discharge nozzle, the fluid material can be supplied alone separately from the supply of the soft ice cream mix. Therefore, since the fluid material does not have to be added to the soft ice cream mix stored in the mix tank, and can be supplied immediately before the discharge nozzle or into the discharge nozzle, the flavor of the fluid materials such as the strawberry jam can be tasted without being diluted by the soft ice cream mix.

Moreover, since the fluid material passes through a passage different from the passage through which the soft ice cream mix passes, the soft ice cream can be obtained using a vegetable or fruit sauce which is poor in heat resistance and which contains acid components.

Furthermore, according to the present invention there is provided a soft ice cream manufacture apparatus comprising: a cooling cylinder for stirring and cooling a mix by a stirrer to manufacture a soft ice cream; an extraction passage for extracting the soft ice cream from the cooling cylinder; a plunger for opening/closing the extraction passage; a sauce passage for supplying a fluid topping sauce to the exit part of the extraction passage; a sauce container for containing the sauce; a sauce pressurizing/feeding device for pressurizing/feeding the sauce to the sauce passage from the sauce container; and a sauce valve for opening/closing the sauce passage.

According to this, since there are provided: the cooling cylinder for stirring and cooling the mix by the stirrer to manufacture the soft ice cream; the extraction passage for extracting the soft ice cream from the cooling cylinder; the plunger for opening/closing the extraction passage; the sauce passage for supplying the fluid topping sauce to the exit part of the extraction passage; the sauce container for containing the sauce; the sauce pressurizing/feeding device for pressurizing/feeding the sauce to the sauce passage from the sauce container; and the sauce valve for opening/closing the sauce passage, the sauce is supplied to the exit part of the extraction passage through which the soft ice cream extracted from the cooling cylinder passes, and the sauce can be added to the surface along the soft ice cream flow.

This can form the unique sauce pattern on the surface of the extracted soft ice cream flow and can increase desires for buying, and a customer can taste the sauce's own flavor from the start till the end of eating.

Particularly, since the sauce passage for pressurizing/feeding the sauce to the extraction passage is provided with the sauce valve to open/close, the sauce passage is closed by the sauce valve in a case where no sauce is added, so that the sauce can securely be prevented from leaking.

Moreover, in the above-described soft ice cream manufacture apparatus of the present invention, the sauce valve operates with the opening/closing of the extraction passage by the plunger to open/close the sauce passage.

According to this, since the above-described sauce valve of the soft ice cream manufacture apparatus operates with the opening/closing of the extraction passage by the plunger to open/close the sauce passage, it is unnecessary to separately operate the extraction of the soft ice cream and the addition of the sauce, and the operability is remarkably enhanced.

Moreover, in the above-described soft ice cream manufacture apparatus of the present invention, it can be selected whether the sauce valve operates with the operation of the plunger or not.

According to this, since it can additionally be selected whether the sauce valve operates with the operation of the plunger or not, in addition to the enhancement of the operability, no trouble occurs in selling the soft ice cream with no sauce added thereto.

Furthermore, in the above-described soft ice cream manufacture apparatus of the present invention, the sauce pressurizing/feeding device operates with the opening of the sauce valve to pressurize/feed the sauce to the sauce passage from the sauce container.

According to this, since the above-described sauce pressurizing/feeding device operates with the opening of the sauce valve to pressurize/feed the sauce to the sauce passage from the sauce container, during the opening of the sauce valve to add the sauce to the soft ice cream, the sauce pressurizing/feeding device automatically pressurizes/feeds the sauce to the sauce passage, so that the sauce can remarkably smoothly be supplied to the extraction passage.

According to the present invention there is provided a soft ice cream manufacture apparatus for manufacturing a soft ice cream comprising: a cooling cylinder provided with an extraction path for extracting the soft ice cream in a front end; an extraction passage provided with an extraction path exit formed in an inner wall surface, and an extraction nozzle for taking out the extracted soft ice cream in a lower end; a plunger, vertically movably disposed in the extraction passage, for closing the extraction nozzle in a lowered state and opening the extraction path exit when moving upward apart from the extraction nozzle; a sauce container for containing a fluid topping sauce; a sauce passage, provided with an exit in the extraction nozzle, for supplying the sauce to the exit from the sauce container; a pressing device for pressing the sauce container to push out the sauce to the sauce passage from the sauce container; and a sauce valve for opening/closing the sauce passage in the vicinity of the sauce passage exit.

According to this, additionally, since this can be achieved by using the existing soft ice cream manufacture apparatus, changing the extraction nozzle and adding the sauce supply structure, general-purpose properties are enhanced. Particularly, since the pressing device pushes the sauce to the sauce passage from the sauce container in the structure, the sauce supply can securely be achieved in the simplified structure.

Moreover, in the above-described soft ice cream manufacture apparatus of the present invention, the sauce valve is vertically movably disposed, closes the sauce passage in the lowered state, and opens the sauce passage by the upward movement, and a connecting arm for disconnectably connecting the sauce valve to the plunger is disposed.

According to this, since in the above-described structure the sauce valve is vertically movably disposed, closes the sauce passage in the lowered state, and opens the sauce passage by the upward movement, and the connecting arm for disconnectably connecting the sauce valve to the plunger is disposed, the plunger and sauce valve can be operated together or be disconnected from each other in the remarkably simple structure, so that production cost can be reduced.

Moreover, in the above-described soft ice cream manufacture apparatus of the present invention, the pressing device constantly applies a pilot pressure to the sauce container, operates with the opening of the sauce valve to increase a pressing force, and lowers the pressing force when the sauce valve closes.

According to this, since the above-described pressing device constantly applies the pilot pressure to the sauce container, and operates with the opening of the sauce valve to increase the pressing force, the sauce can quickly be added with the extraction of the soft ice cream. Moreover, when the sauce valve closes, the pressing force is lowered, so that the pressure applied to the sauce container is minimized, and the container can be prevented or inhibited from being ruptured.

Moreover, in the above-described soft ice cream manufacture apparatus of the present invention, the sauce container comprises a main body provided with an extraction port connected to the sauce passage, and a bottom wall disposed opposite to the extraction port so that the bottom wall can move toward the extraction port in the main body in a close abutment state on the inner wall of the main body, and the pressing device presses this bottom wall.

According to this, since the above-described sauce container comprises the main body provided with the extraction port connected to the sauce passage, and the bottom wall disposed opposite to the extraction port so that the bottom wall can move toward the extraction port in the main body in the close abutment state on the inner wall of the main body, and the pressing device is constituted to press this bottom wall, the sauce in the sauce container can substantially completely be used up, economical efficiency is enhanced, and the sauce extraction by the pressing device is stabilized.

Furthermore, the above-described soft ice cream manufacture apparatus of the present invention is provided with a cylinder for charging the sauce container, an inner lid rotatably and movably supported to openably close a cylinder opening, a notch directed and cut to the movable direction of the inner lid from the edge of the inner lid on a non-supported side, and a stopper for stopping rotation while the inner lid moves to the non-supported side, the extraction port of the sauce container is drawn from the notch, and the pressing device presses the bottom wall of the sauce container disposed opposite to the extraction port.

According to this, the above-described constitution is provided with the cylinder for charging the sauce container, the inner lid rotatably and movably supported to openably close the cylinder opening, the notch directed and cut to the movable direction of the inner lid from the edge of the inner lid on the non-supported side, and the stopper for stopping the rotation while the inner lid moves to the non-supported side, the extraction port of the sauce container is drawn from the notch, and the pressing device presses the bottom wall of the sauce container disposed opposite to the extraction port, so that the inner lid can be moved/rotated while the sauce container extraction port is drawn to open/close the cylinder opening, and the charging/changing operation of the sauce container is remarkably facilitated. Moreover, the stopper inhibits the inner lid moved to the non-supported side from rotating, and the sauce container can therefore be held without any problem even when the pressing force is applied by the pressing device.

BRIEF DESCRIPTION OF THE DRAWINGS

Moreover.

BEST MODE FOR CARRYING OUT THE INVENTION

Figure 1:
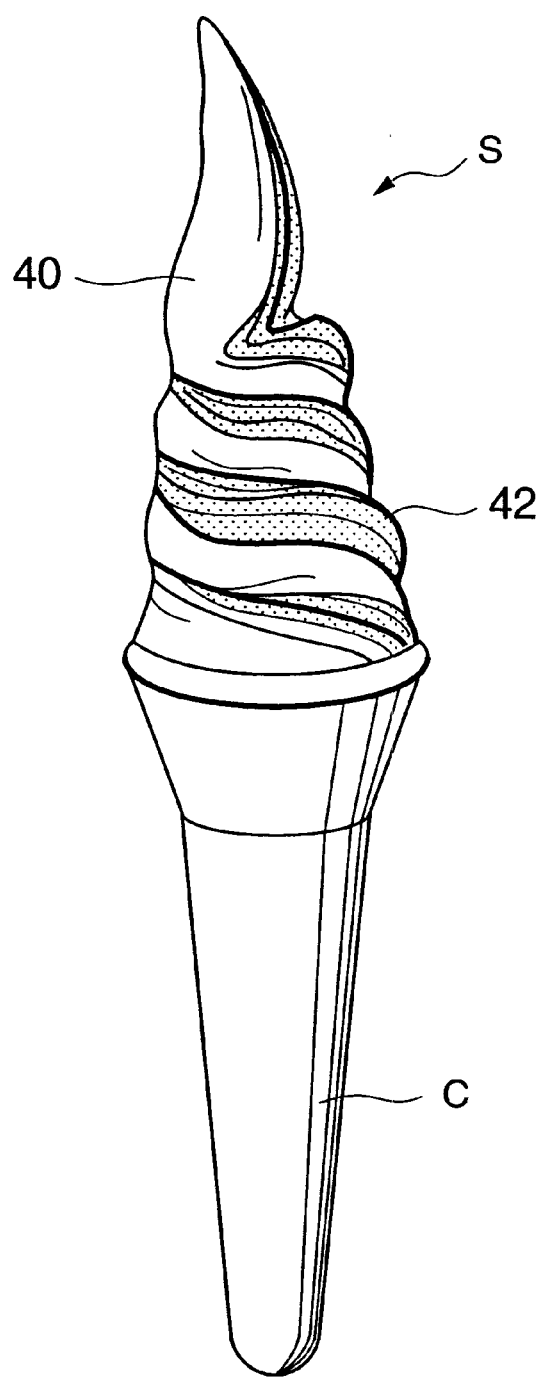
FIG. 1 is a perspective view showing one example of a soft ice cream according to the present invention.

One example of a soft ice cream according to the present invention is shown in FIG. 1. The soft ice cream of FIG. 1 is obtained by charging a cream flow S of a cooled and semi-hardened soft ice cream mix discharged from a discharge nozzle into a corn cup C so that the discharge shape is maintained as much as possible.

The cream flow S shown in FIG. 1 is formed by a part 40 formed of a soft ice cream mix and a part 42 formed of a strawberry jam. Therefore, the soft ice cream is provided with a spotted pattern of the white part 40 and red part 42, and exhibits a bright appearance.

Moreover, the red part 42 formed of the strawberry jam substantially contains no soft ice cream mix and has the flavor of the strawberry jam itself. Therefore, when one has the soft ice cream shown in FIG. 1, the one can simultaneously taste the soft ice cream mix flavor and the flavor of the strawberry jam itself. Such flavor can be tasted even in the soft ice cream part charged into the cup C.

As the material forming this part 42, fluid materials such as the strawberry jam can be used, which are substantially contain no soft ice cream mix and which exhibit fluidity to the same degree as that of the cooled and semi-hardened soft ice cream mix. Particularly, the vegetable or fruit sauces such as the strawberry jam can preferably be used.

Here, the vegetable or fruit sauce can also be attached to the soft ice cream by a method of immersing the protruded part of the soft ice cream protruded from the cup C into the vegetable or fruit sauce pooled in the container. However, according to this method, the vegetable or fruit sauce can be attached to the entire surface of the protruded part of the soft ice cream, but the pattern cannot be formed, and the vegetable or fruit sauce cannot be attached to the cream flow charged into the cup C.

Moreover, the soft ice cream mix forming the part 40 is obtained by adding water by about twice the amount to soft ice cream mix powder (40 to 45% of sucrose, about 50% of solid milk content), and cooling and semi-hardening the mix.

Figure 2:
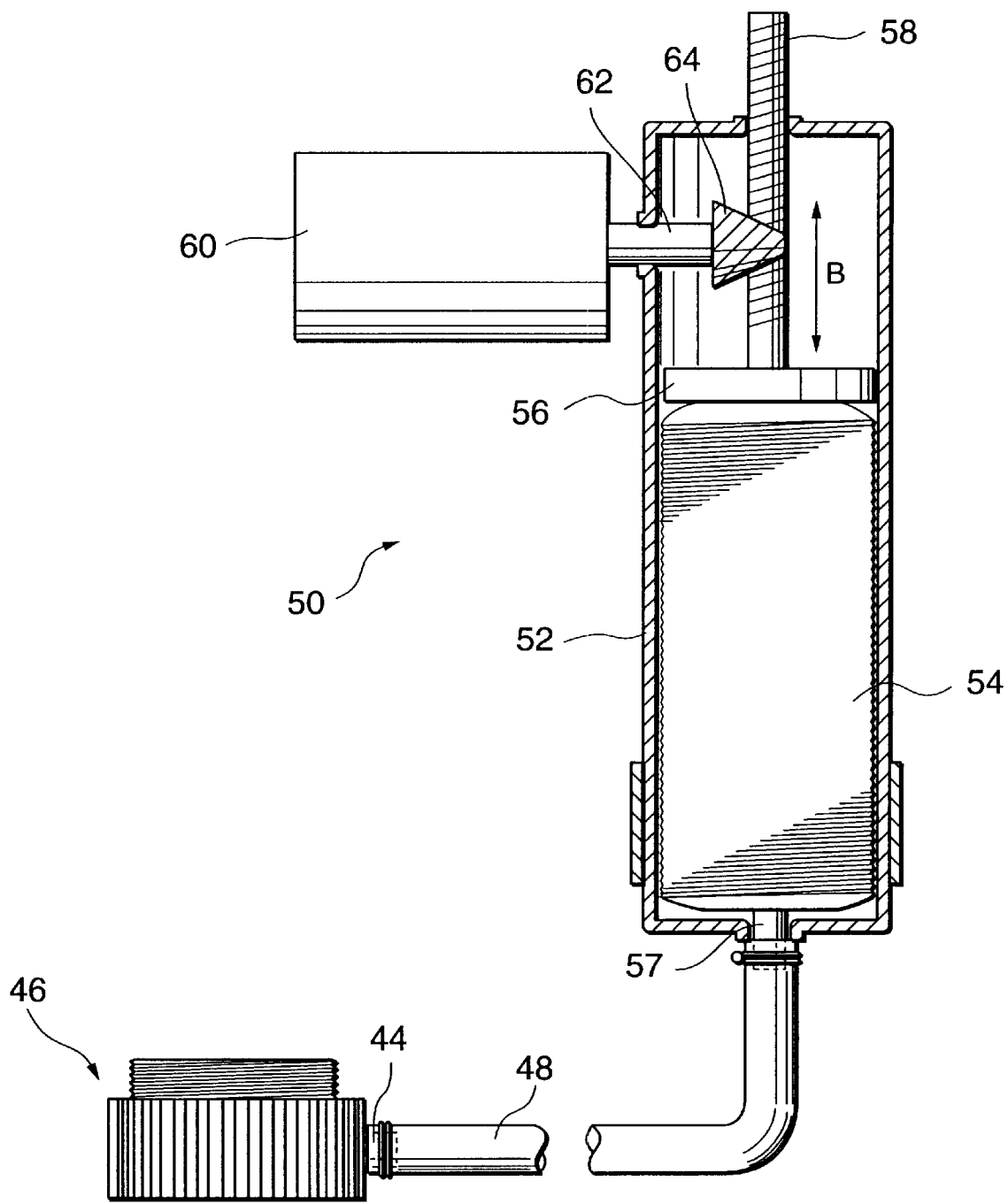
FIG. 2 is an explanatory view showing a soft ice cream manufacture apparatus of the present invention.
Figure 9:
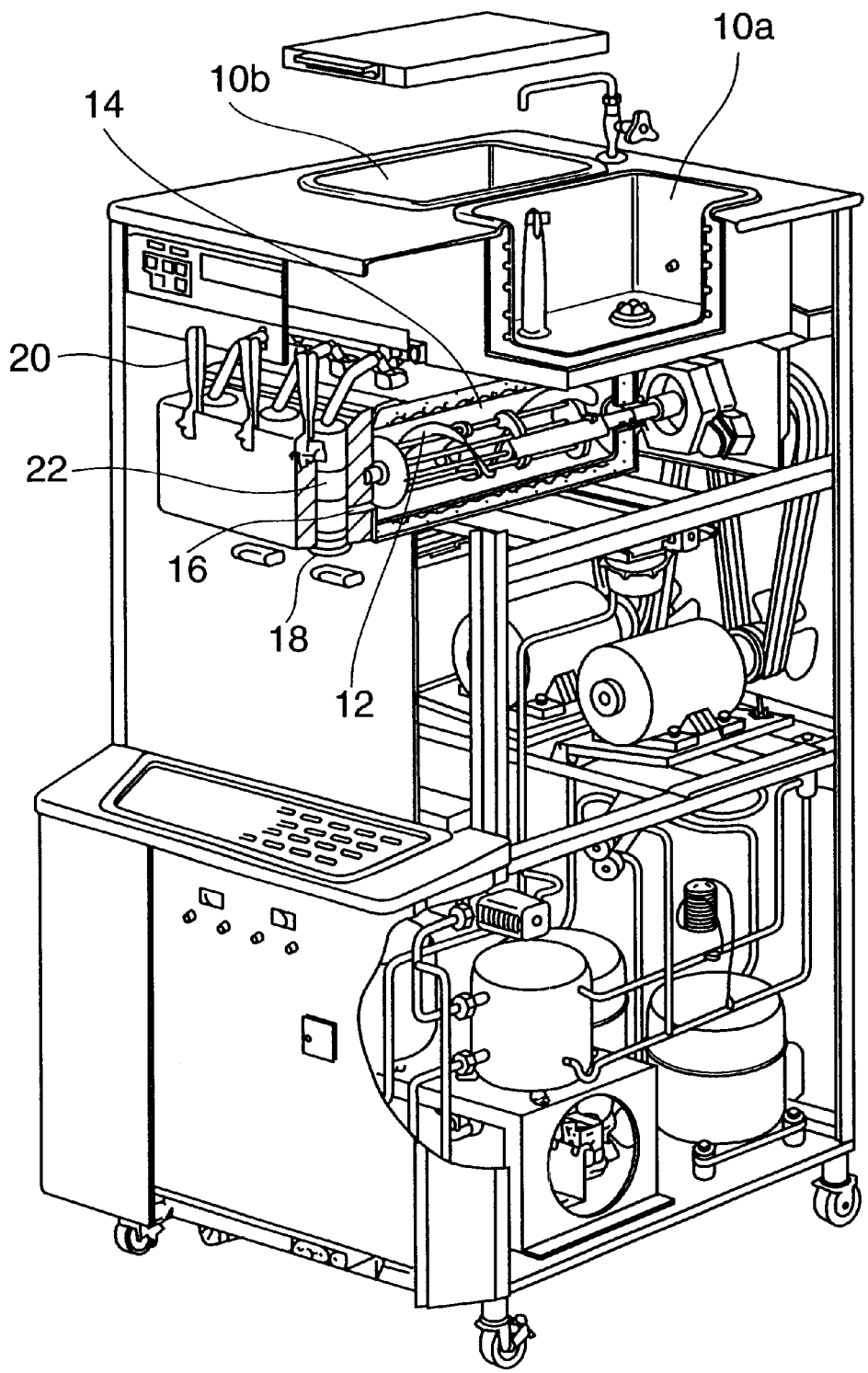
FIG. 9 is an explanatory view showing the soft ice cream freezer structure.

For the soft ice cream shown in FIG. 1, as the adapter 18 of the soft ice cream freezer shown in FIG. 9, as shown in FIG. 2, an adapter 46 is used to which inserted is an addition nozzle 44 for adding the strawberry jam as the fluid material to the semi-hardened soft ice cream mix flow. A discharge nozzle for discharging the cream flow is formed in this adapter 46, and the addition nozzle 44 is connected to a strawberry jam supply device 50 by a tube 48.

In this supply device 50, a container 54 is inserted into a casing 52, and an aperture part 57 disposed in one end surface of the container 54 is connected to the other end of the tube 48 whose one end is connected to the addition nozzle 44. The side wall of the container 54 is formed in a bellows shape and is deformable.

Furthermore, a piston 56 abuts on the other end surface of the container 54, and a rod 58 extended from the piston 56 is formed into a gear. The gear of the rod 58 meshes with a gear 64 disposed on the tip end of a rotation shaft 62 of a variable rotating motor 60, and can reciprocate the piston 56 in an arrow B direction in accordance with the rotation direction of the variable rotating motor 60. The reciprocating motion speed can also be adjusted by adjusting the rotation speed of the variable rotating motor 60.

According to the supply device 50 shown in FIG. 2, the strawberry jam can be supplied to the addition nozzle 44 of the adapter 46 via the tube 48 by pressing and deforming the container 54 charged with the strawberry jam by the piston 56, and the supply speed can be adjusted by adjusting the rotation speed of the variable rotating motor 60.

Figure 3:
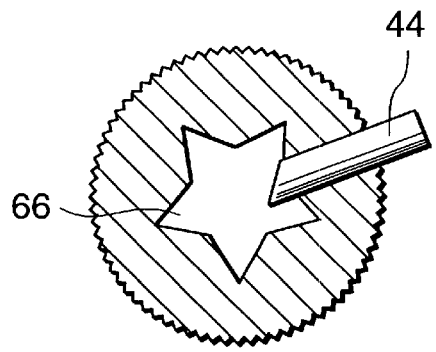
FIG. 3 is a transverse sectional view showing one example of a discharge nozzle constituting the soft ice cream manufacture apparatus of the present invention.

The addition nozzle 44 is, as shown in FIG. 3, opened in the vicinity of the inner wall surface of a star-shaped discharge nozzle 66 formed in the adapter 46, and the strawberry jam supplied to the addition nozzle 44 is added to the soft ice cream mix flow passing through the discharge nozzle 66.

Figure 4:
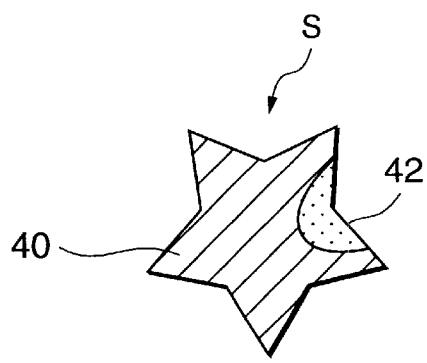
FIG. 4 is a transverse sectional view of the cream flow discharged from the discharge nozzle shown in FIG. 3.
Figure 5:
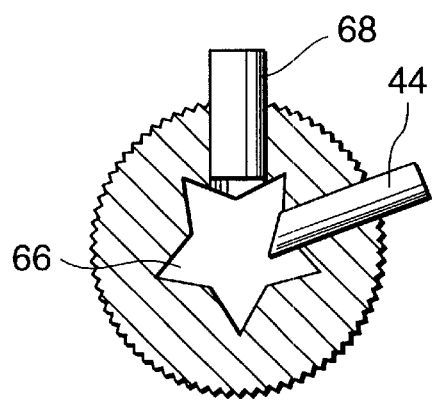
FIG. 5 is a transverse sectional view showing another example of the discharge nozzle constituting the soft ice cream manufacture apparatus of the present invention.

Therefore, the cream flow S discharged from the discharge nozzle 66 shown in FIG. 3 is formed by the soft ice cream mix part 40 and strawberry jam part 42 as shown in FIG. 4. In the cream flow S, the strawberry jam part 42 is disposed in the vicinity of the peripheral edge of the cream flow S and has a small area as compared with the soft ice cream mix part 40.

Additionally, the discharge nozzle 66 shown in FIG. 3 is formed in the star shape, but a triangular or rectangular shape, or an elliptical or circular shape may be formed.

A manufacture of the soft ice cream shown in FIG. 1 will next be described in which the adapter 46 connected to the strawberry jam supply device 50 shown in FIGS. 2 and 3 by the tube 48 is mounted on the soft ice cream freezer instead of the adapter 18 shown in FIG. 9.

First, a predetermined amount of liquid soft ice cream mix obtained by adding water by about twice the amount to the soft ice cream mix powder (40 to 45% of sucrose, about 50% of solid milk content) is added to the mix tank 10a. This liquid soft ice cream mix is stirred in the cooling chamber 14 provided with the stirrer 12 to form the semi-hardened soft ice cream mix. Moreover, the container 54 charged with the strawberry jam is inserted into the casing 52 of the supply device 50, and the other end of the tube 48 whose one end is connected to the addition nozzle 44 is connected to the aperture part 57 of the container 54 protruded from the casing 52.

Figure 10A:
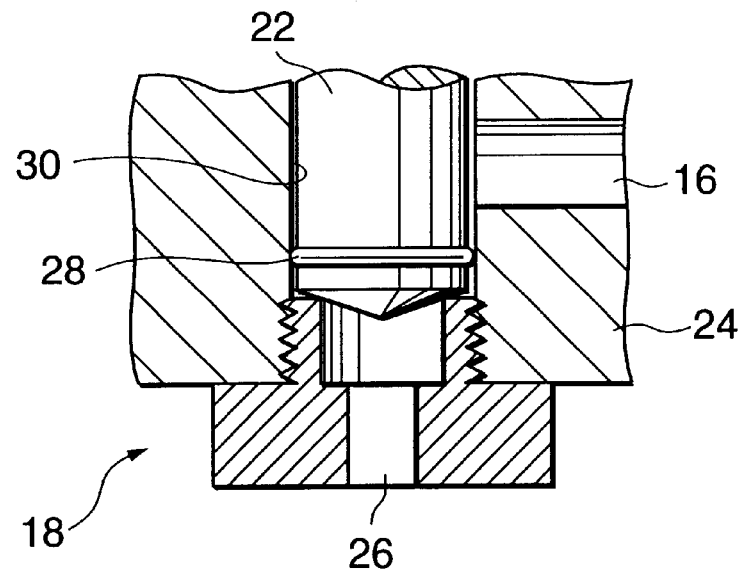
FIGS. 10a and 10b are explanatory view showing the motion of the plunger of the soft ice cream freezer shown in FIG. 9.
Figure 10B:
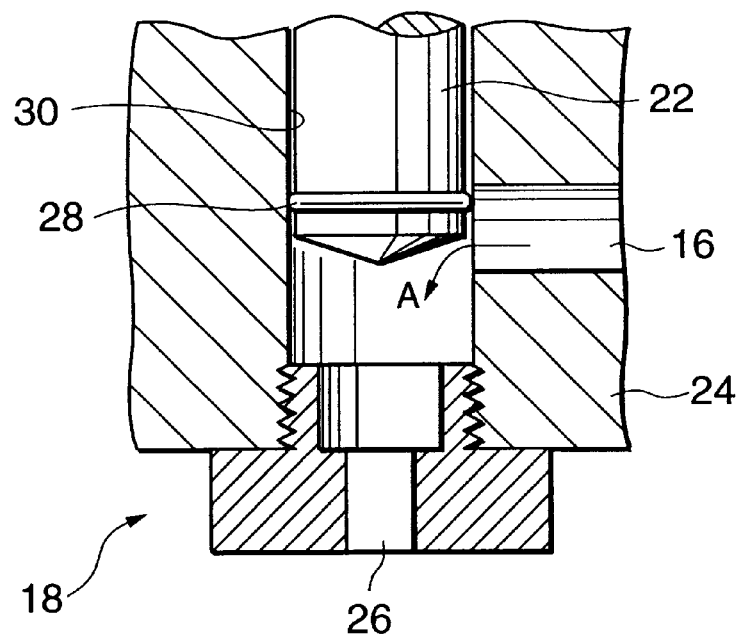

Subsequently, as shown in FIG. 10(a), the lever 20 is lowered to move upward the plunger 22 whose tip end surface abuts on the end surface of the adapter 46, and by detaching the tip end surface of the plunger 22 from the end surface of the adapter 46 as shown in FIG. 10(b), the passage leading to the discharge nozzle 66 from the exit hole 16 formed in the wall surface of the cooling chamber 14 is opened, so that the semi-frozen soft ice cream mix of the cooling chamber 14 is discharged from the discharge nozzle 66.

Additionally, the discharge amount of the semi-hardened soft ice cream mix can be adjusted by adjusting the downward lowering amount of the lever 20 and adjusting the upward movement distance of the plunger 22.

In this case, the variable rotating motor 60 of the supply device 50 is driven to press and deform the container 54 by the piston 56, and the strawberry jam in the container 54 is supplied to the addition nozzle 44. The strawberry jam supplied to the addition nozzle 44 is continuously added to the semi-frozen soft ice cream mix flow passing through the discharge nozzle 66 and, as shown in FIG. 4, the cream flow S in which the strawberry jam part 42 is disposed in the vicinity of the peripheral edge of the soft ice cream mix part 40 is discharged from the discharge nozzle 66. The discharged cream flow S is charged into the corn C while the shape is maintained as much as possible, and the soft ice cream shown in FIG. 1 can be obtained.

Here, the strawberry jam is continuously added to the discharge nozzle 66, but the strawberry jam can intermittently be added by intermittently driving the variable rotating motor 60. When the strawberry jam is intermittently added to the discharge nozzle 66, and the soft ice cream is obtained, the part 42 formed of the strawberry jam intermittently appears in the soft ice cream shown in FIG. 1.

In the above-described FIGS. 2 and 3, only the addition nozzle 44 is inserted into the discharge nozzle 66, but there may be disposed a cleaning nozzle 68 for spraying hot water or water to clean the strawberry jam, soft ice cream mix, and the like adhering inside the discharge nozzle 66 when the manufacture of the soft ice cream is halted, so that the inside of the discharge nozzle 66 is kept to be clean even during a pause in the manufacture of the soft ice cream.

Figure 6:
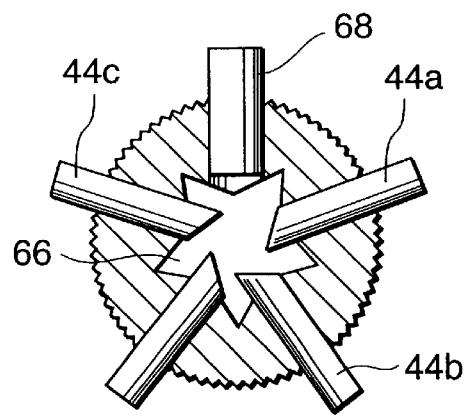
FIG. 6 is a transverse sectional view showing another example of the discharge nozzle constituting the soft ice cream manufacture apparatus of the present invention.

Furthermore, as shown in FIG. 6, a plurality of addition nozzles 44a, 44b, 44c may be inserted into the discharge nozzle 66. The same fluid material (e.g., the same strawberry jam) may be supplied to the respective addition nozzles 44a, 44b, 44c. In this case, a branch tube branched midway from the tube 48 connected to the aperture part 57 of the container 54 of the supply device 50 is connected to each addition nozzle. When the strawberry jam is supplied to each addition nozzle in this manner to obtain the soft ice cream, in the obtained soft ice cream pattern, the red part constituted of the strawberry jam can further finely be formed as compared with the soft ice cream shown in FIG. 1.

Moreover, different types of fluid materials (e.g., strawberry jam, blueberry jam, apricot jam) may be supplied to the respective addition nozzles 44a, 44b, 44c.

The supply of the fluid materials such as the strawberry jam in the vicinity of the inner peripheral surface of the discharge nozzle 66 has been described above, but the fluid material may be supplied to the vicinity of the center of the discharge nozzle 66. For this, as shown in FIG. 7, the plunger 22 is preferably used in which the addition nozzle is formed along the central axis direction of the plunger 22.

Figure 7:
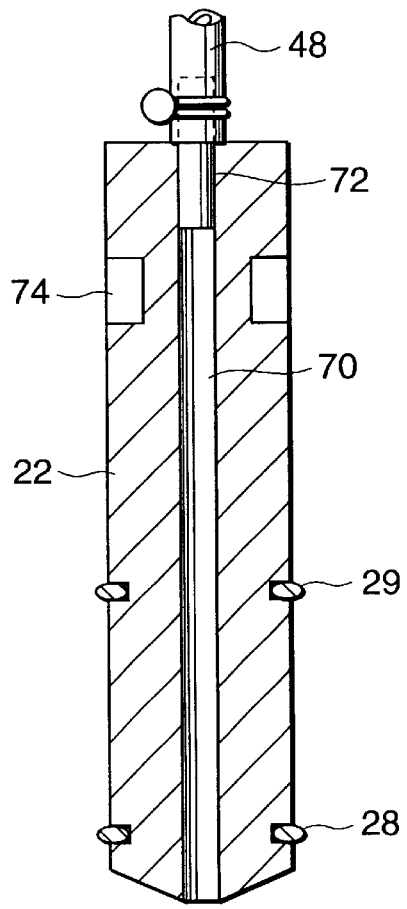
FIG. 7 is a longitudinal sectional view showing one example of a plunger constituting the soft ice cream manufacture apparatus of the present invention.

The addition nozzle shown in FIG. 7 includes a pierced hole 70 formed along the central axis of the plunger 22, one end of the pierced hole 70 is opened in the tapered tip end surface, and the other end is opened in the top surface of the plunger 22. In the opening of the top surface of the plunger 22 in the pierce hole 70, inserted is the other end of a short tube 72 with one end connected to the tube 48 to which the fluid materials such as the strawberry jam are supplied from the supply device 50.

The plunger 22 is provided with an O ring 28 in the vicinity of the tapered tip end surface and an O ring 29 disposed above the O ring 28, and the exit hole 16 formed in the wall surface of the cooling chamber 14 is opened between the O rings 28 and 29.

Additionally, in a recessed part 74 opened in the side surface of the plunger 22, the tip end of the lever 20 (FIG. 9) is inserted.

Figure 8:
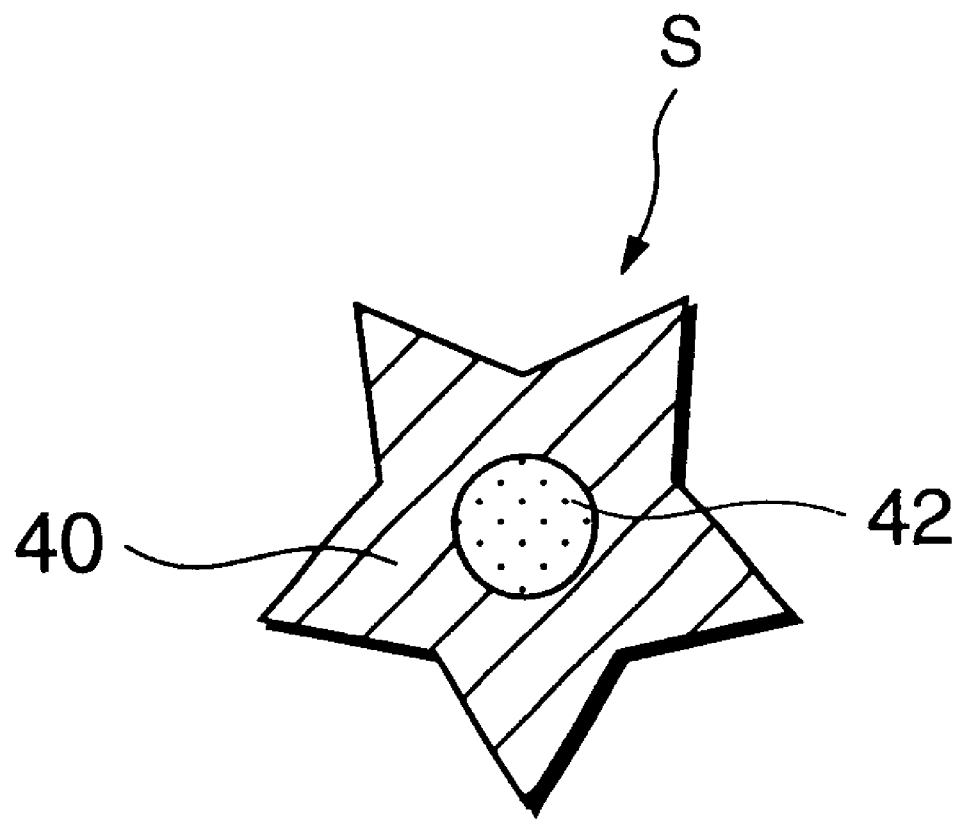
FIG. 8 is a transverse sectional view of the cream flow discharged from the discharge nozzle using the plunger shown in FIG. 7.

When the soft ice cream is manufactured using the plunger 22 shown in FIG. 7, by moving downward the lever 20 to move upward the plunger 22 whose tip end surface abuts on the end surface of the adapter 46 as shown in FIG. 10(a), and detaching the tip end surface of the plunger 22 from the end surface of the adapter 46 as shown in FIG. 10(b), the passage leading to the discharge nozzle 66 from the exit hole 16 disposed in the wall surface of the cooling chamber 14 is opened, and the semi-frozen soft ice cream mix of the cooling chamber 14 is discharged from the discharge nozzle 66. In this case, by driving the variable rotating motor 60 of the supply device 50 to press and deform the container 54 by the piston 56 at the predetermined speed, the strawberry jam in the container 54 is supplied to the pierced hole 70 of the plunger 22. The strawberry jam supplied to the pierced hole 70 is continuously added substantially to the central part of the semi-frozen soft ice cream mix flow passing through the discharge nozzle 66. Therefore, as shown in FIG. 8, the discharge nozzle 66 discharges the cream flow S in which the part 42 formed of the strawberry jam is substantially disposed in the central part of the part 40 formed of the soft ice cream mix.

The discharged cream flow S is charged to the corn C while the shape is maintained as much as possible, the soft ice cream with substantially the same shape as that of the soft ice cream formed of only the soft ice cream mix is obtained, but the soft ice cream mix flavor and strawberry jam flavor can simultaneously be tasted when having the obtained soft ice cream.

Here, the strawberry jam is continuously supplied to the pierced hole 70, but the strawberry jam can intermittently be supplied by intermittently driving the variable rotating motor 60. When the strawberry jam is intermittently supplied to the pierced hole 70, for the obtained soft ice cream, the part 42 formed of the strawberry jam is intermittently present substantially in the central part of the cream flow S.

In the above-described description, the jam is used as the fluid material in the example, but chocolate, cocoa, and the like may be used as the fluid material. Since no soft ice cream mix is substantially added to the fluid materials such as the chocolate and cocoa, the unique flavors of the chocolate, cocoa, and the like can sufficiently be enjoyed.

Furthermore, the vegetable and fruit easily changed in properties by heating and containing acid components may be formed into the jam by a mixer, and the like and then used. Since the jam material passes through a passage different from the passage through which the soft ice cream mix passes, the jam material is not susceptible to heat influence by periodic heating sterilization with respect to the liquid soft ice cream mix, and the separation of the jam material from the milk content during storage can be avoided.

Another soft ice cream controller 101 of the present invention will next be described with reference to FIGS. 11 to 14.

Figure 11:
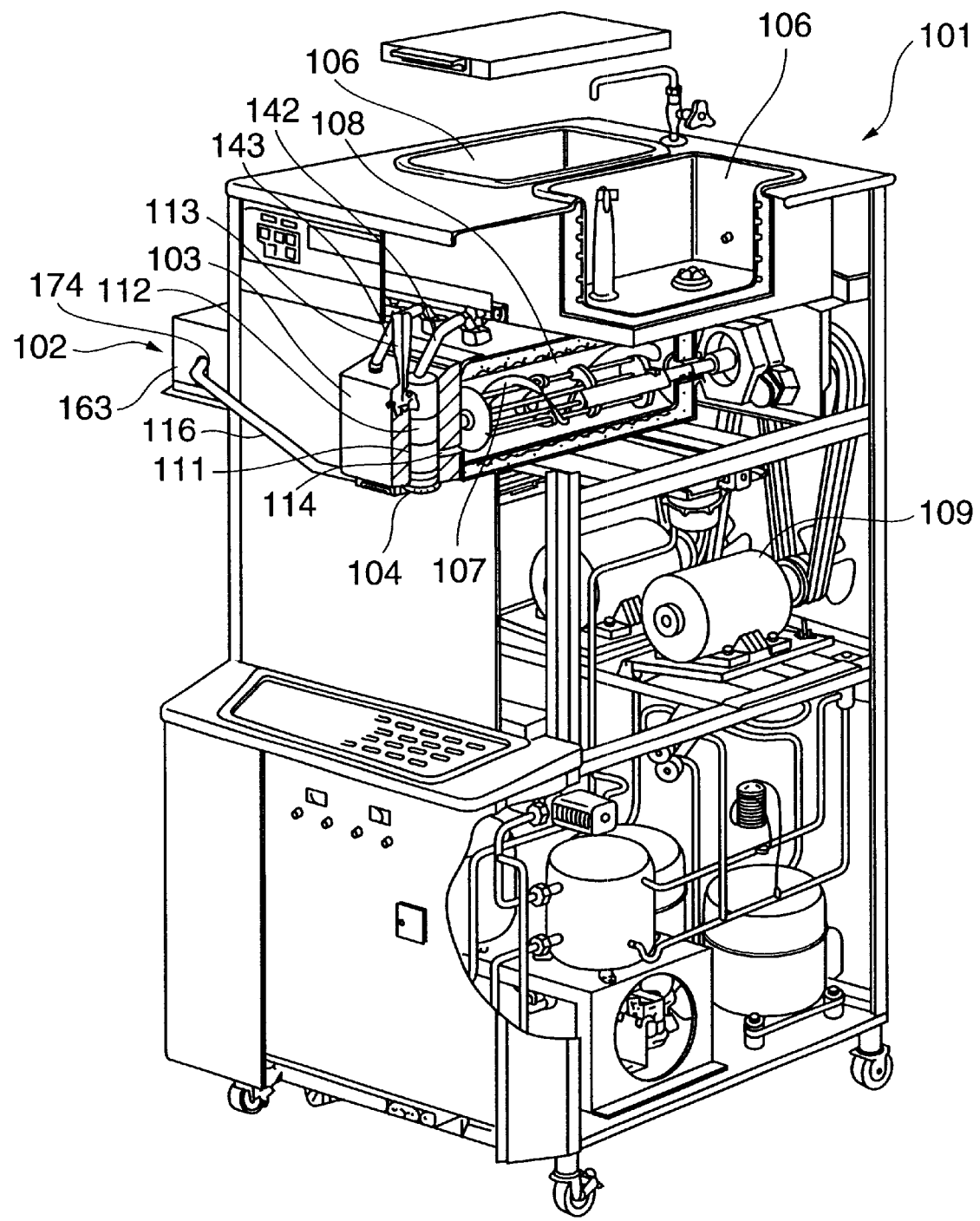
FIG. 11 is a longitudinally sectional perspective view of the soft ice cream manufacture apparatus according to another embodiment of the present invention.

In FIG. 11, the soft ice cream manufacture apparatus 101 of this embodiment manufactures and extracts the soft ice cream, for example, into the corn cup, and raises, generates and sells a spiral soft ice cream flow, and there are disposed mix tanks 106, 106 for pooling the liquid soft ice cream mix, and a cooling cylinder 108 provided with a beater (stirrer) 107 for stirring, cooling and semi-hardening the liquid soft ice cream mix. Additionally, numeral 109 denotes a beater motor for rotating/driving the beater 107.

Numeral 103 denotes a freezer door attached to the front face of the soft ice cream manufacture apparatus 101 before the cooling cylinder 108, and a vertical extraction passage 111 is formed in the freezer door 103. Moreover, a plunger 112 is vertically movably inserted into the extraction passage 111, and the plunger 112 is vertically moved by a front face lever 113. On the other hand, an extraction path 114 is formed below the front end of the cooling cylinder 108, and the exit of the extraction path 114 is formed in the inner wall surface of the extraction passage 111.

Moreover, an extraction nozzle 104 is attached to the lower end of the extraction passage 111 of the freezer door 103 from below, and a sauce pressurizing/feeding device 102 is installed on the side surface of the soft ice cream manufacture apparatus 101 beside the freezer door 103. This sauce pressurizing/feeding device 102 is connected to the extraction nozzle 104 by a hose 116 constituting the sauce passage.

Figure 12:
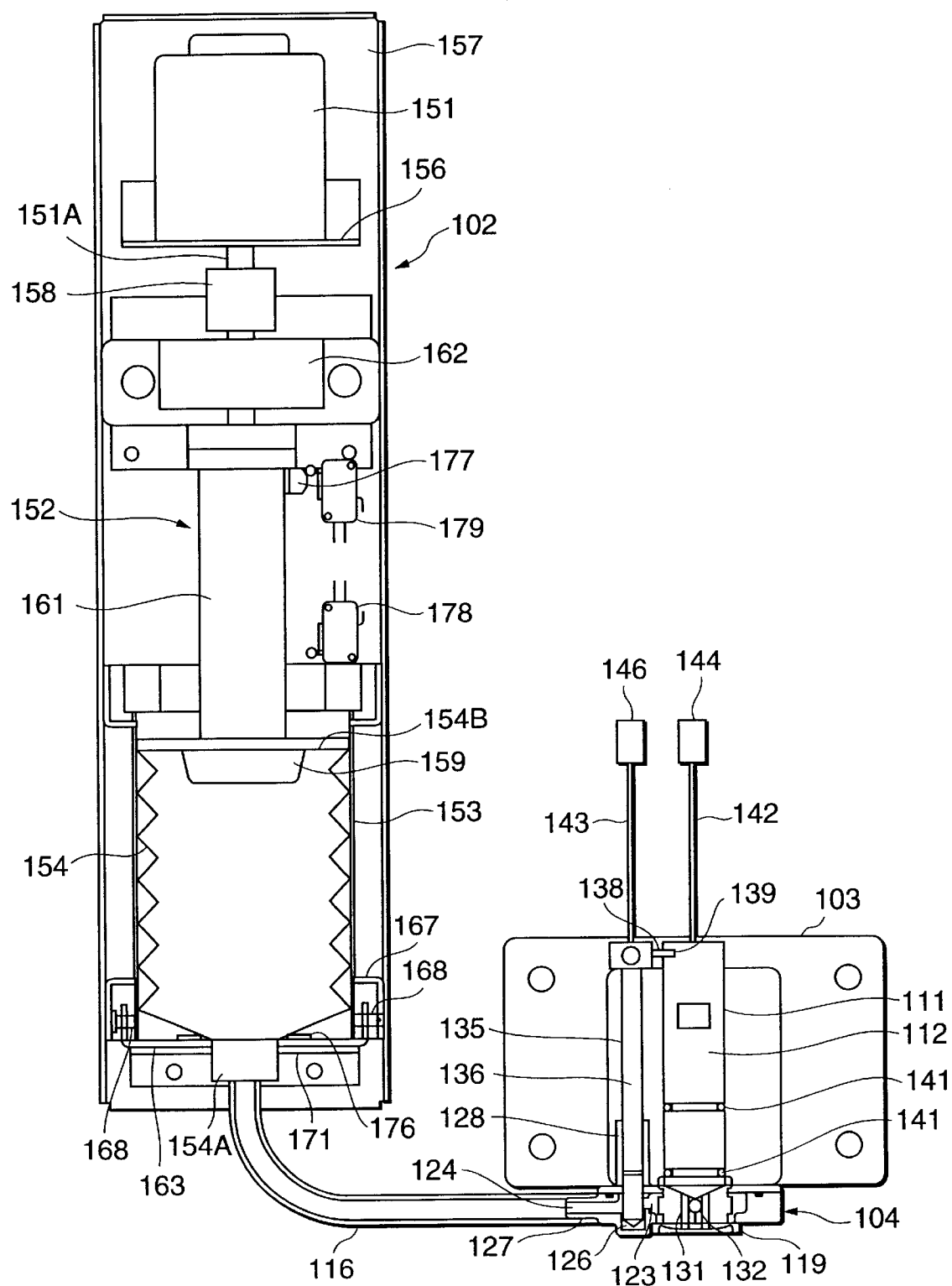
FIG. 12 is a schematic view of a sauce pressurizing/feeding device of the soft ice cream manufacture apparatus of FIG. 11.
Figure 13:
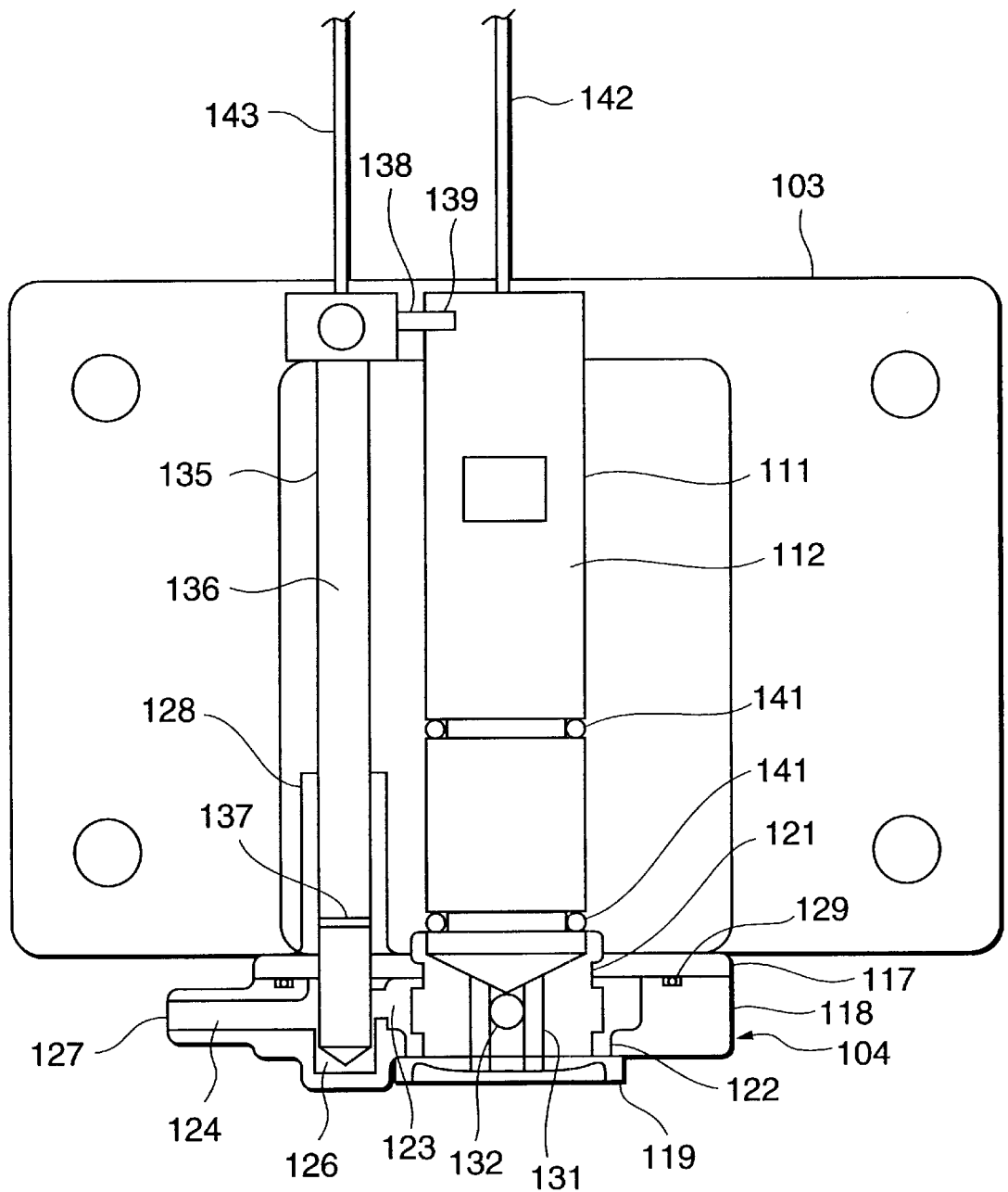
FIG. 13 is a front view showing a freezer door part of the soft ice cream manufacture apparatus of FIG. 11.
Figure 14:
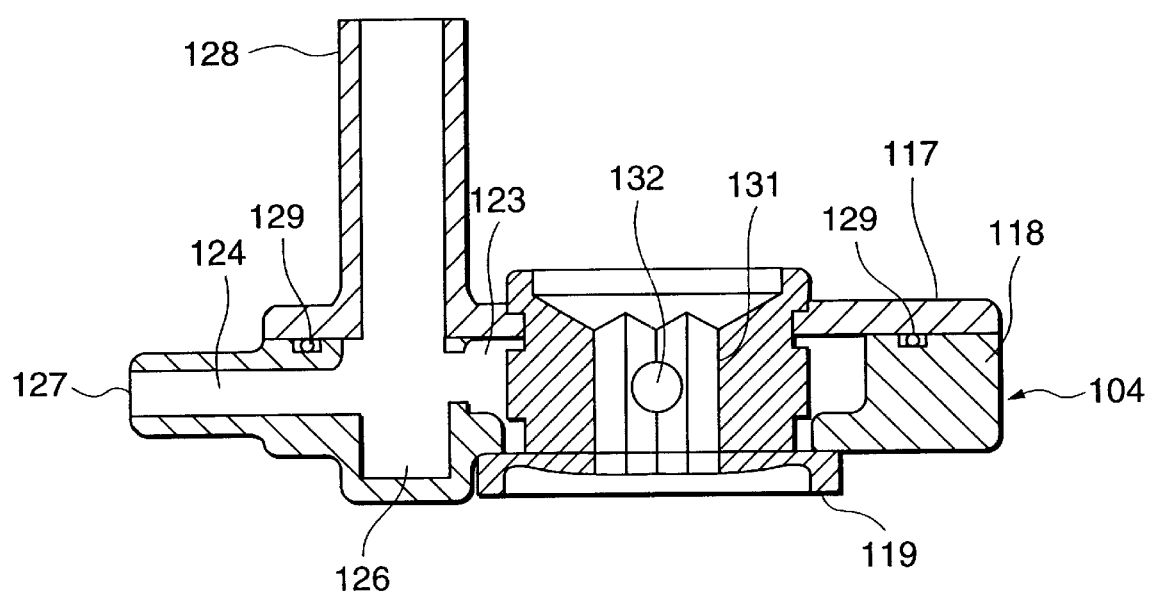
FIG. 14 is a longitudinally sectional front view of an extraction nozzle of the soft ice cream manufacture apparatus of FIG. 11.

Next, in FIGS. 12 to 15 each extraction nozzle 104 is constituted by polymerizing a metal nozzle upper member 117 and a nozzle lower member 118, and engagement holes 121, 122 for engaging with a star-shaped adapter 119 are formed in the substantially central part of both members 117, 118. As shown in the plan view of FIG. 15, the nozzle lower member 118 is provided with an annular groove 123 for surrounding the periphery of the engagement hole 122, guide grooves 124 (each constituting a part of the sauce passage) extending to the side from the annular groove 123, and a recessed part 126 with a circular section formed on the side of the annular groove 123 of the guide groove 124, the end of the guide groove 124 is used as a connection port 127, and the hose 116 is connected to the connection port 127 (FIG. 12).

On the other hand, in the nozzle upper member 117, a cylindrical holding cylinder part 128 is formed to rise from a position beside the engagement hole 121 and above the recessed part 126. Moreover, when the nozzle upper member 117 is polymerized with the nozzle lower member 118 via a packing 129, a semi-circular arc passage connected to a connection port 127 is constituted in the periphery of the engagement grooves 121, 122. In this state the star-shaped adapter 119 is engaged in both engagement holes 121, 122 from below.

Figure 15:
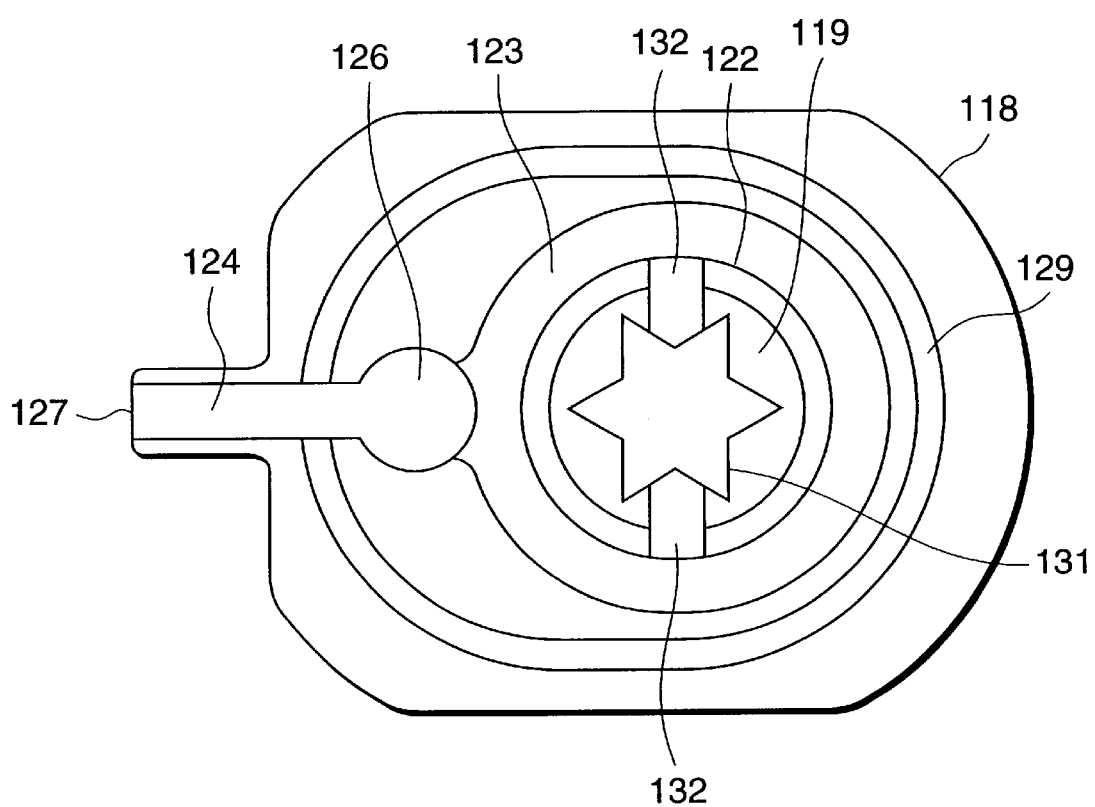
FIG. 15 is a plan view showing the nozzle lower member of the extraction nozzle of FIG. 14.

The star-shaped adapter 119 is a cylindrical member as shown in FIG. 15, a star-shaped through hole 131 is vertically formed through the central part, and a screw groove for engaging with the freezer door 103 is formed in the top end of the side wall. Moreover, the top surface in the periphery of the through hole 131 is inclined to be low toward the center. Furthermore, exits 132, 132 for connecting the through hole 131 to the outer surface are formed in the opposite side walls, and both exits 132, 132 engaged in the engagement holes 121, 122 of the extraction nozzle 104 are connected to the annular groove 123 of the nozzle lower member 118.

The extraction nozzle 104 assembled in this manner is attached to the freezer door 103 by screwing and attaching the star-shaped adapter 119 to the lower end of the extraction passage 111 of the freezer door 103. The lower end of the plunger 112 has a conical shape with a pointed center tip end in order to meet the top surface shape of the star-shaped adapter 119, and the plunger 112 is constantly lowered to closely abut on the through hole 131 of the star-shaped adapter 119 by the lower end, so that the through hole is closed and the exit of the extraction path 114 is also closed by the side surface. Subsequently, when the plunger 112 is moved upward by the operation of the lever 113, the lower end is detached from the through hole 131, and opens the exit of the extraction path 114.

Moreover, while the extraction nozzle 104 is attached to the freezer door 103, the holding cylinder part 128 rises beside the extraction passage 111, and continues to the lower end of a holding hole 135 formed in the freezer door 103. Moreover, a sauce valve 136 is inserted into the holding hole 135 and holding cylinder part 128 from above. The sauce valve 136 is, for example, a metal rod with a circular section, and is vertically movably held in the holding hole 135 and holding cylinder part 128, and the lower end is substantially dimensioned to be just fit in the recessed part 126. In this structure, when the sauce valve 136 is lowered, the lower end enters the recessed part 126 to close the guide groove 124. Subsequently, when the sauce valve 136 moves upward, the guide groove 124 is opened. Additionally, numeral 137 denotes an O ring attached to the periphery of the sauce valve 136 to seal a gap with the holding cylinder part 128.

A connecting arm 138 rotatable on a horizontal plane is attached to the top end of the sauce valve 136, and an engagement groove 139 disengageably engaged with the connecting arm 138 is formed in the top part of the plunger 112. Additionally, numeral 141 denotes an O ring which is attached to the periphery of the plunger 112 to seal a gap with the extraction passage 111.

Moreover, numerals 142, 143 denote arms for operating a soft ice cream extraction switch 144 and sauce extraction switch 146, and are disposed on the front face of the soft ice cream manufacture apparatus 101 to abut on the top surfaces of the plunger 112 and sauce valve 136.

On the other hand, the sauce pressurizing/feeding device 102 is constituted of a sauce extraction motor 151 and a pressing device 152 to form the pressing device, and a cylinder 153, and a sauce container 154 is detachably attached inside the cylinder 153. The sauce extraction motor 151 is installed on the rear end of a base 157 by a fixing plate 156, and a rotation shaft 151A is connected to the pressing device 152 via a coupling 158.

The pressing device 152 is constituted of a shaft 161 with a piston 159 attached to the tip end thereof, and a bearing 162, and converts the rotation of the sauce extraction motor 151 to the back and forth operation (linear operation) of the shaft 161 and piston 159. Additionally, in the structure the piston 159 advances when the sauce extraction motor 151 rotates forward, and the piston retreats when the motor rotates backward. Moreover, a pusher 177 is attached to the side surface rear end of the shaft 161, a sold-out switch 178 and initial position switch 179 are installed back and forth on the base 157 between the bearing 162 and the cylinder 153, and the pusher 177 abuts on the switches by the movement of the shaft 161 in the positional relation.

The sauce container 154 mounted in the cylinder 153 is a deformable resin bottle whose periphery is formed in a bellows shape, a bottom wall 154B is positioned on the side of the piston 159, the piston 159 abuts on the bottom wall 154B, and an extraction port 154A positioned opposite to the bottom wall 154B is drawn forward from the cylinder 153 and mounted.

As the sauce charged into the sauce container 154, fluid materials such as the strawberry jam are used, which substantially contains no soft ice cream mix and which exhibits the fluidity to the same degree as that of the cooled and semi-hardened soft ice cream mix. Moreover, the soft ice cream mix for use is obtained by adding water by about twice the amount to the soft ice cream mix powder (40 to 45% of sucrose, about 50% of solid milk content).

Here, numeral 163 denotes an inner lid for opening/closing the front face opening of the cylinder 153, and 164 denotes a handgrip disposed on one end of the inner lid 163.

Figure 16:
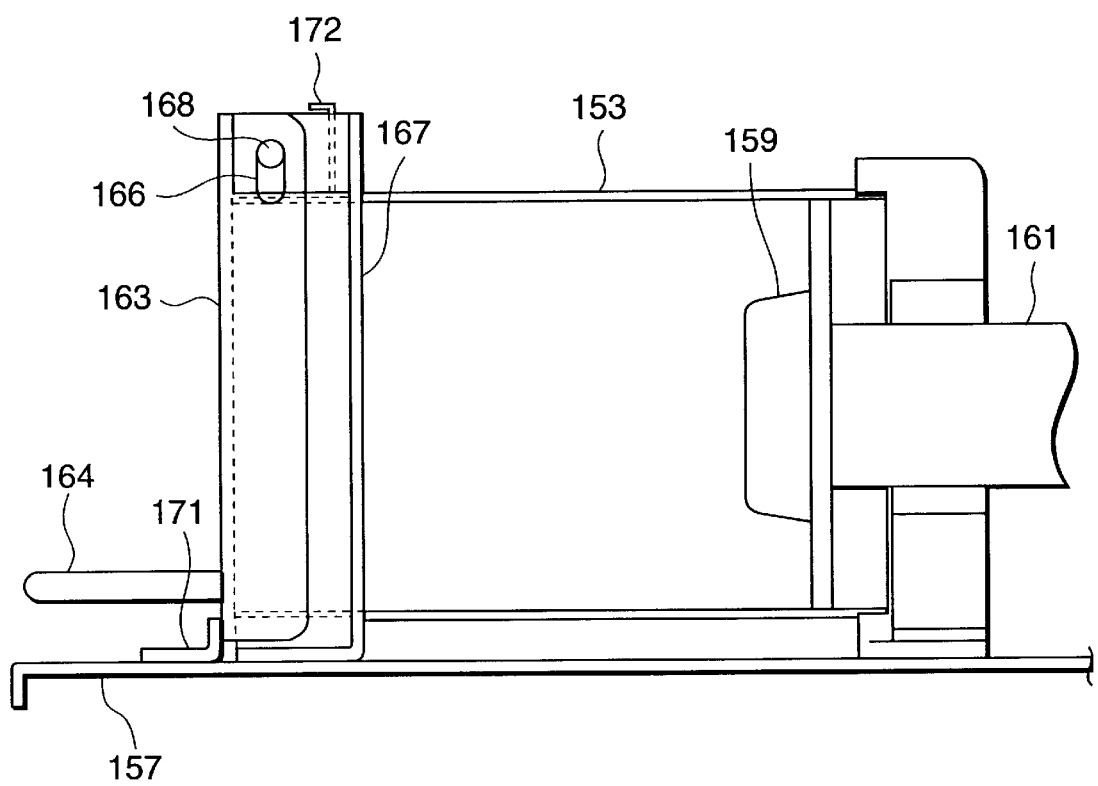
FIG. 16 is a side view showing the inner lid part of the sauce pressurizing/feeding device of FIG. 12.
Figure 17:
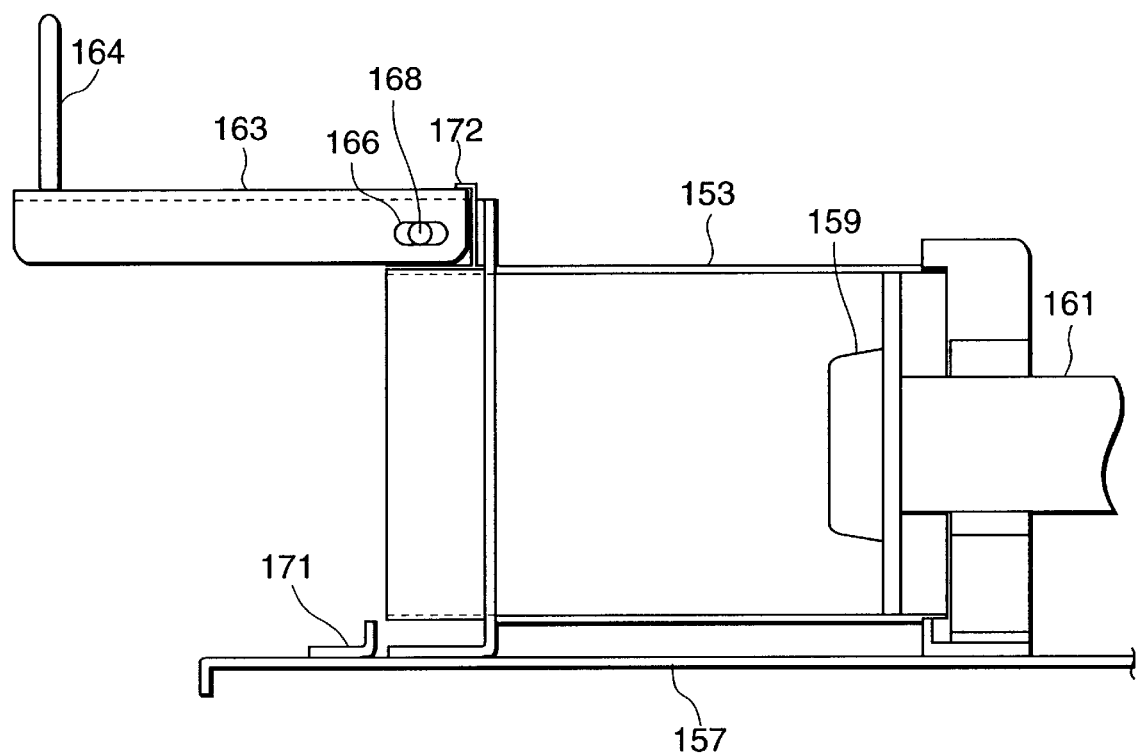
FIG. 17 is a side view of the sauce pressurizing/feeding device when the inner lid is opened.

As shown in FIGS. 16, 17, a long hole 166 is formed in the other end of the inner lid 163, and a shaft 168 protruded to both sides is disposed on the top part of a front plate 167 for fixing the cylinder 153 to the base 157. Moreover, the inner lid 163 is rotatably and movably supported on the cylinder 153 by rotatably and movably engaging the shaft 168 to the long hole 166.

While the inner lid 163 closes the front face of the cylinder 153, one end of the inner lid 163 facing downward lowers (moves to the non-supported side), and is engaged with the rear side of a press plate 171 as a stopper attached to the base 157 as shown in FIG. 16. This prevents the inner lid 163 from being opened when the piston 159 presses the lid, and the sauce container 154 is held in the cylinder 153.

Subsequently, when the sauce container 154 is changed, the handgrip 164 is held to lift up the inner lid 163 along the long hole 166 (move to the supported side), the engagement with the press plate 171 is released, and one end is rotated upward to the front to open the front face of the cylinder 153. Subsequently, by pushing inward the lid in a horizontal state, the other end (rear end) of the inner lid 163 is engaged in a substantially reverse L-shaped engagement plate 172 attached to the top part of the front plate 167, so that the open state is held (FIG. 17).

A notch 174 cut upward from the lower edge center substantially in a U shape is formed in the inner lid 163, and the extraction port 154A of the sauce container 154 is drawn forward from the notch 174 while the inner lid 163 closes the front face of the cylinder 153. Therefore, since the inner lid 163 is opened simply by lifting up and opening the lid as described above, the changing/mounting of the sauce container 154 is remarkably facilitated. Additionally, in this case, a washer-shaped metal plate 176 is interposed between the periphery of the extraction port 154A of the sauce container 154 and the inner lid 163, and used for reinforcement. Moreover, the hose 116 is connected to the extraction port 154A.

Figure 18:
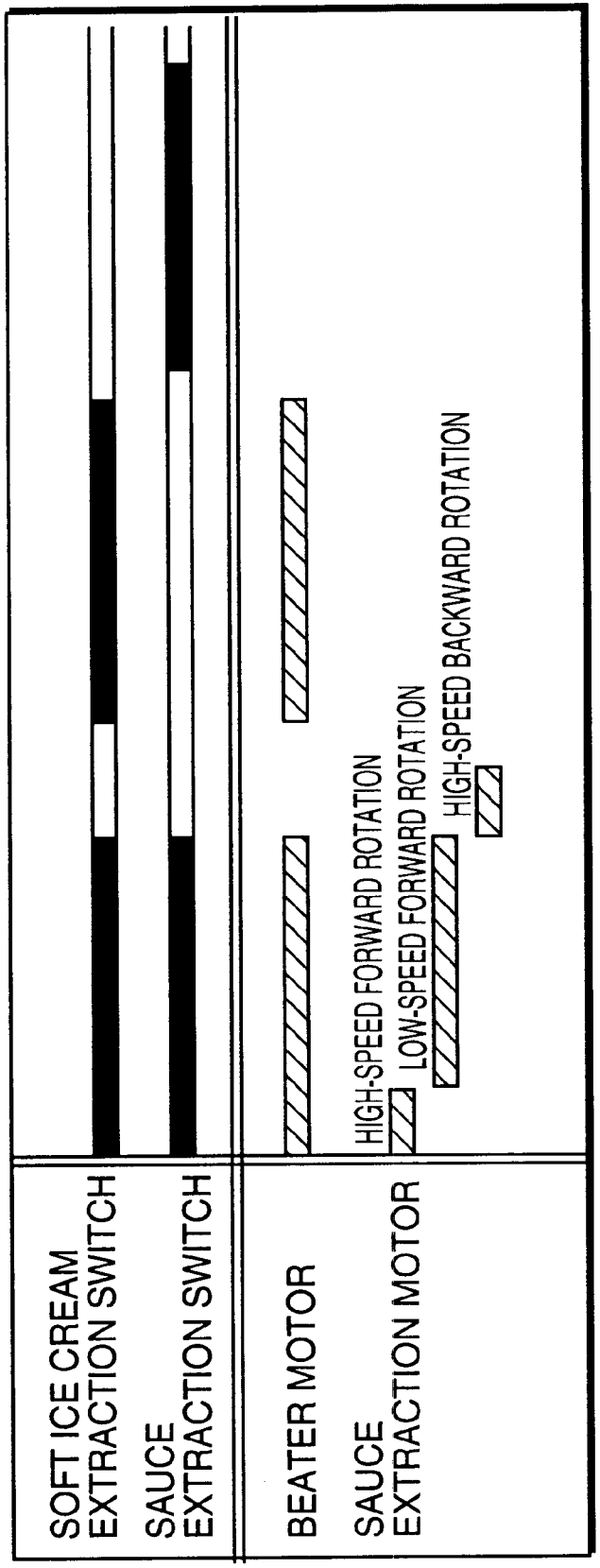
FIG. 18 is a timing chart showing the operation of the soft ice cream manufacture apparatus of FIG. 11.

The operation of the soft ice cream manufacture apparatus 101 of the present invention in the above-described constitution will be described with reference to the timing chart of FIG. 18. The predetermined amount of liquid soft ice cream mix obtained by adding water by about twice the amount to the soft ice cream mix powder (40 to 45% of sucrose, about 50% of solid milk content) is added to the mix tank 106.

Subsequently, the liquid soft ice cream mix is guided into the cooling cylinder 108 as described above, stirred by the beater 107 and cooled, so that the semi-hardened soft ice cream is generated. Moreover, the inner lid 163 is opened as described above to mount the sauce container 154 with the strawberry jam sealed therein in the sauce pressurizing/feeding device 102, the piston 159 is pressed against the bottom wall 154B, and the hose 116 is connected to the extraction port 154A.

Additionally, while the sauce container 154 is set in this manner, the controller (not shown) rotates forward the sauce extraction motor 151, then stops the motor, presses the sauce container 154 slightly from behind, and applies a predetermined pilot pressure.

Moreover, it is assumed that the connecting arm 138 of the sauce valve 136 is engaged in the engagement groove 139 of the plunger 112. Subsequently, by lowering the lever 113 to move the plunger 112 upward, the plunger 112 is detached from the through hole 131 of the star-shaped adapter 119, and the exit of the extraction path 114 is opened. Moreover, since the soft ice cream extraction switch 144 is turned on via the arm 142 by raising the plunger 112, the controller drives the beater motor 109 to rotate the beater 107.

In this case, the semi-hardened soft ice cream in the cooling cylinder 108 is pushed forward, enters the extraction passage 111 from the extraction path 114, and is extracted via the through hole 131 of the star-shaped adapter 119 of the extraction nozzle 104.

On the other hand, since the connecting arm 138 of the sauce valve 136 is engaged in the engagement groove 139 of the plunger 112, the sauce valve 136 rises with the rising of the plunger 112. When the sauce valve 136 rises, the guide groove 124 is opened as described above, and the sauce container 154 is connected to the extraction nozzle 104 via the hose 116.

Moreover, since the sauce extraction switch 146 is turned on via the arm 143 by raising the sauce valve 136, the controller rotates forward the sauce extraction motor 151. In this case, since the piston 159 presses the bottom wall 154B of the sauce container 154, the sauce in the sauce container 154 is pushed out of the extraction port 154A, and passes through the hose 116 into the extraction nozzle 104.

The sauce having entered the extraction nozzle 104 reaches the annular groove 123 from the guide groove 124, and is then branched to the left and right and discharged from the exits 132, 132. In this case, since the controller first rotates forward the sauce extraction motor 151 at a high speed, and changes the speed to a low speed after a predetermined period, the sauce in the sauce container 154 is quickly discharged from the exits 132, 132.

Therefore, since the sauce formed of the strawberry jam is continuously added to the peripheral edge along the flow of the soft ice cream extracted from the extraction passage 111 via the through hole 131 of the star-shaped adapter 119, the unique sauce pattern is formed on the surface of the extracted soft ice cream, the desire for buying is increased, and the customer can taste the strawberry jam flavor from the start till the end of eating.

Moreover, since the sauce is not mixed into the mix tank 106, the material whose properties are changed by heating sterilization can also be used, and the bright appearance and unique flavor of the soft ice cream can be provided.

Subsequently, in order to end the extraction, the lever 113 is pushed upward and the plunger 112 is pulled downward. In this case, the plunger 112 closes the exit of the extraction path 114, and closely abuts on the through hole 131 of the star-shaped adapter 119, so that the soft ice cream extraction is stopped. Moreover, since the soft ice cream extraction switch 144 is also turned off via the arm 142, the controller stops the beater motor 109.

Furthermore, since the sauce valve 136 is also pulled downward with the lowering of the plunger 112, the guide groove 124 in the extraction nozzle 104 is closed, so that the sauce addition is also stopped. Moreover, since the sauce valve 136 closes the guide groove 124, the sauce leak from the exit 132 is also inhibited.

Subsequently, the sauce extraction switch 146 is also turned off via the arm 143, the controller ends the low-speed forward rotation of the sauce extraction motor 151, and then rotates backward the sauce extraction motor 151 at a high speed for the predetermined period. The backward rotation period is set as a period for returning the piston 159 to such an extent that the above-described pilot pressure is applied to the sauce container 154. This prevents an excessive pressure from being constantly applied to the sauce container 154. Moreover, since the metal plate 176 is interposed between the sauce container 154 and the inner lid 163, the container is pressed by the piston 159 from behind, so that the disadvantage of breakage of the extraction port 154A is also prevented.

The volume of the sauce container 154 is gradually reduced by the addition of sauce, the piston 159 reaches the extraction port 154A, then the pusher 177 pushes the sold-out switch 178, and the controller thus detects that the sauce container 154 is emptied. Subsequently, the controller performs a predetermined sold-out display, and additionally rotates backward the sauce extraction motor 151 at the high speed to return the piston 159 to the initial position. The controller detects the initial position when the pusher 177 pushes the initial position switch 179.

Here, in order to sell the soft ice cream with no sauce added thereto, the connecting arm 138 of the sauce valve 136 is rotated, and moved out of the engagement groove 139 of the plunger 112 to release the engagement. Thereby, even when the lever 113 is pulled downward and the plunger 112 is pushed upward, the sauce valve 136 does not rise, the guide groove 124 is not opened, and therefore the sauce addition is not performed.

Figure 19:
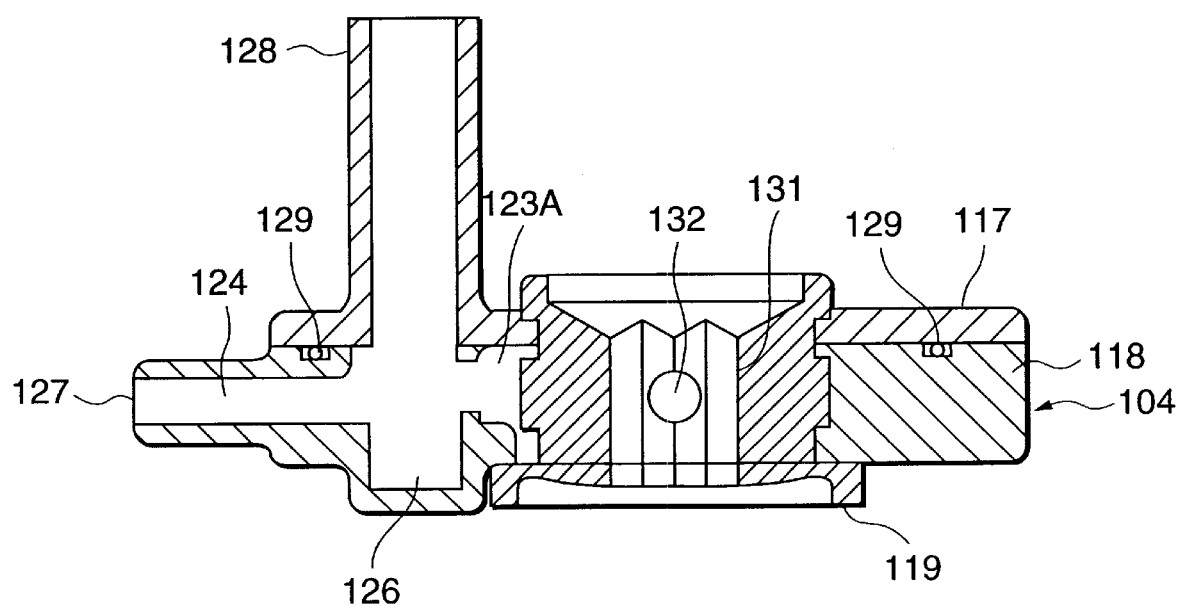
FIG. 19 is a longitudinally sectional front view showing another embodiment of the extraction nozzle of the soft ice cream manufacture apparatus of FIG. 11.
Figure 20:
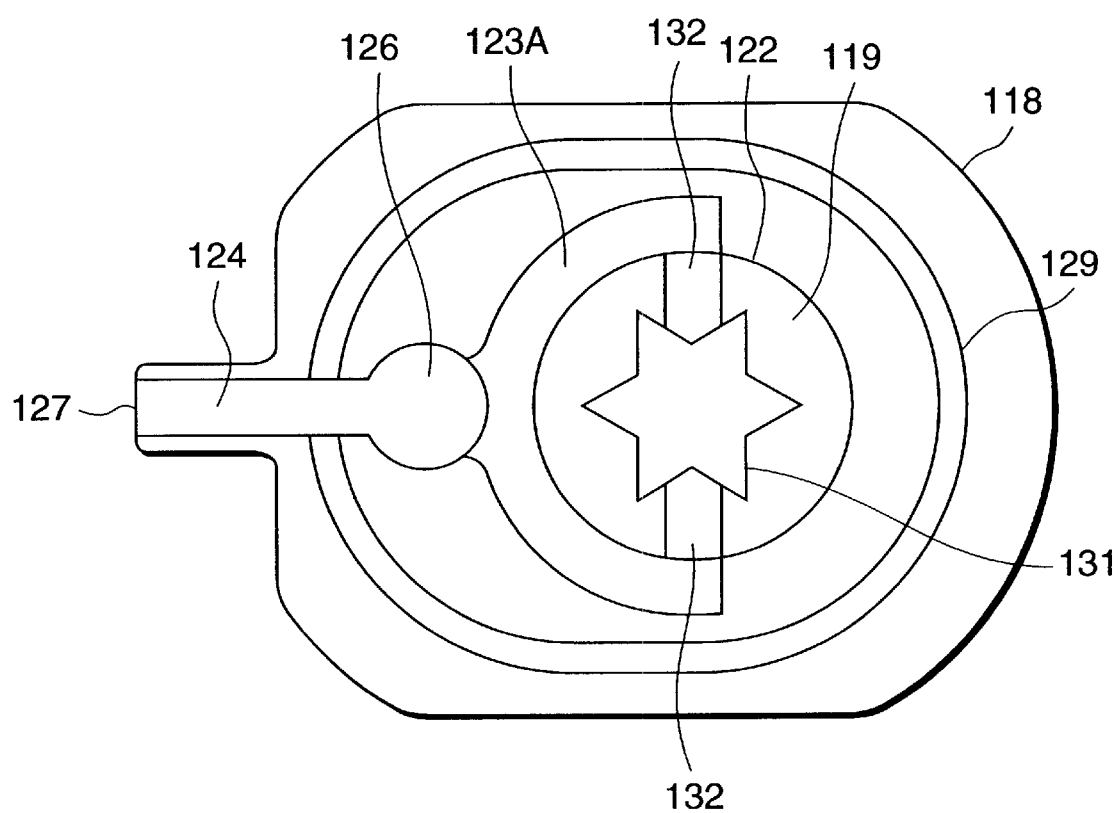
FIG. 20 is a plan view showing the nozzle lower member of the extraction nozzle of FIG. 19.

Next, FIGS. 19, 20 show another embodiment of the present invention. As shown in the plan view of FIG. 20, a circular arc groove 123A substantially surrounding the half periphery of the engagement hole 122 is formed in the periphery of the engagement hole 122 of the nozzle lower member 118 of the extraction nozzle 104, and the guide groove 124 extends sideways from the middle part of the circular arc groove 123A. Moreover, while the star-shaped adapter 119 is engaged in the engagement holes 121, 122 of the extraction nozzle 104, both exits 132, 132 are connected to the terminal end of the circular arc groove 123A of the nozzle lower member 118.

Figure 21:
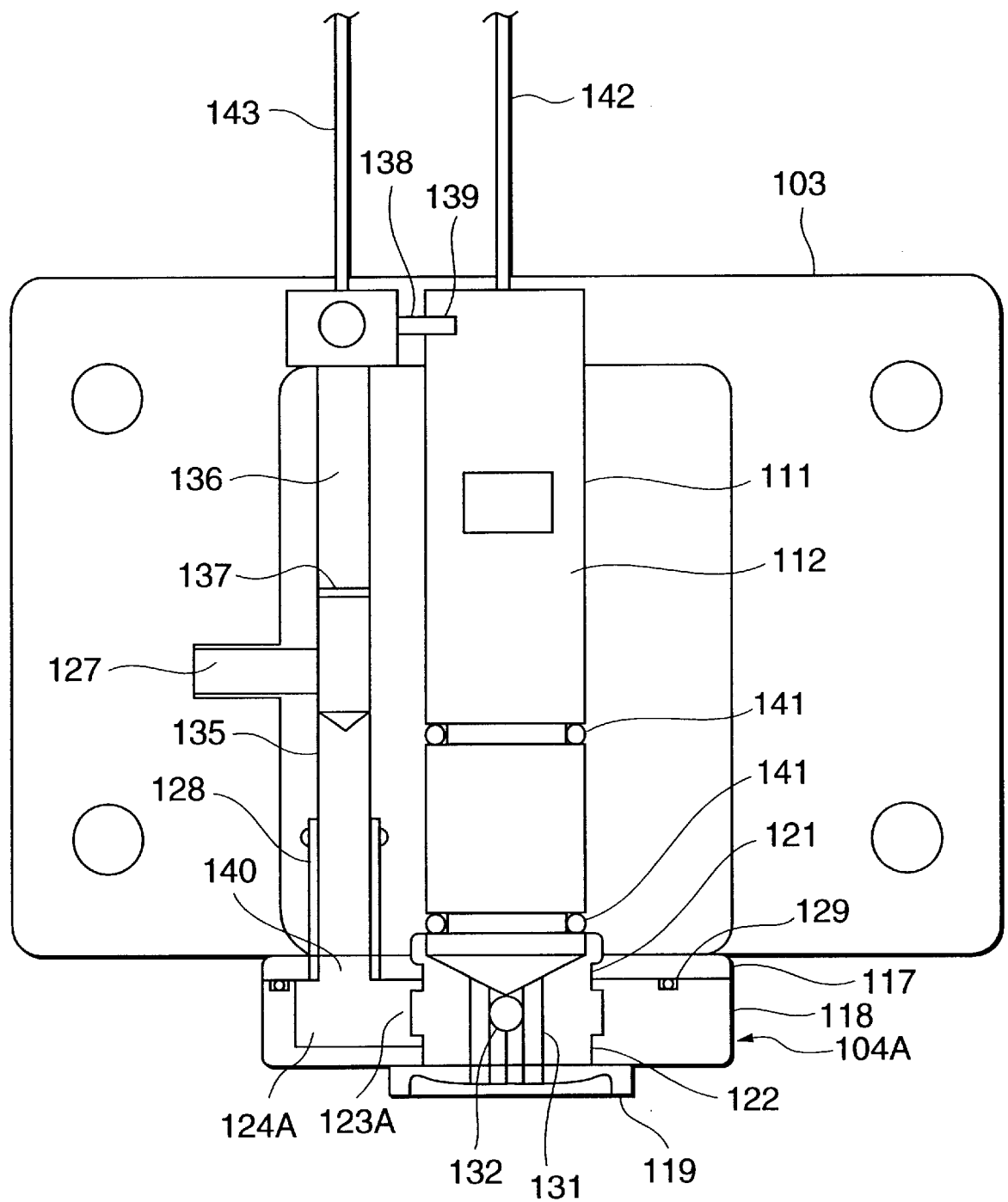
FIG. 21 is a front view showing another embodiment of the freezer door part of the soft ice cream manufacture apparatus of FIG. 11.

Furthermore, FIG. 21 shows still another embodiment of the present invention, the connection port 127 and recess 126 are not formed in an extraction nozzle 104A in this case, and a guide groove 124A in the case is connected to the holding hole 135 of the freezer door 103 via a hole 140 of the nozzle upper member 117. The connection port 124 is formed in the holding hole 135, the hose 116 is connected to the port, and the sauce valve 136 vertically moves to open/close the connection port 124 of the holding hole 135 in the structure. According to this constitution, the structure of the extraction nozzle 104 (104A) is simplified.

Figure 22:
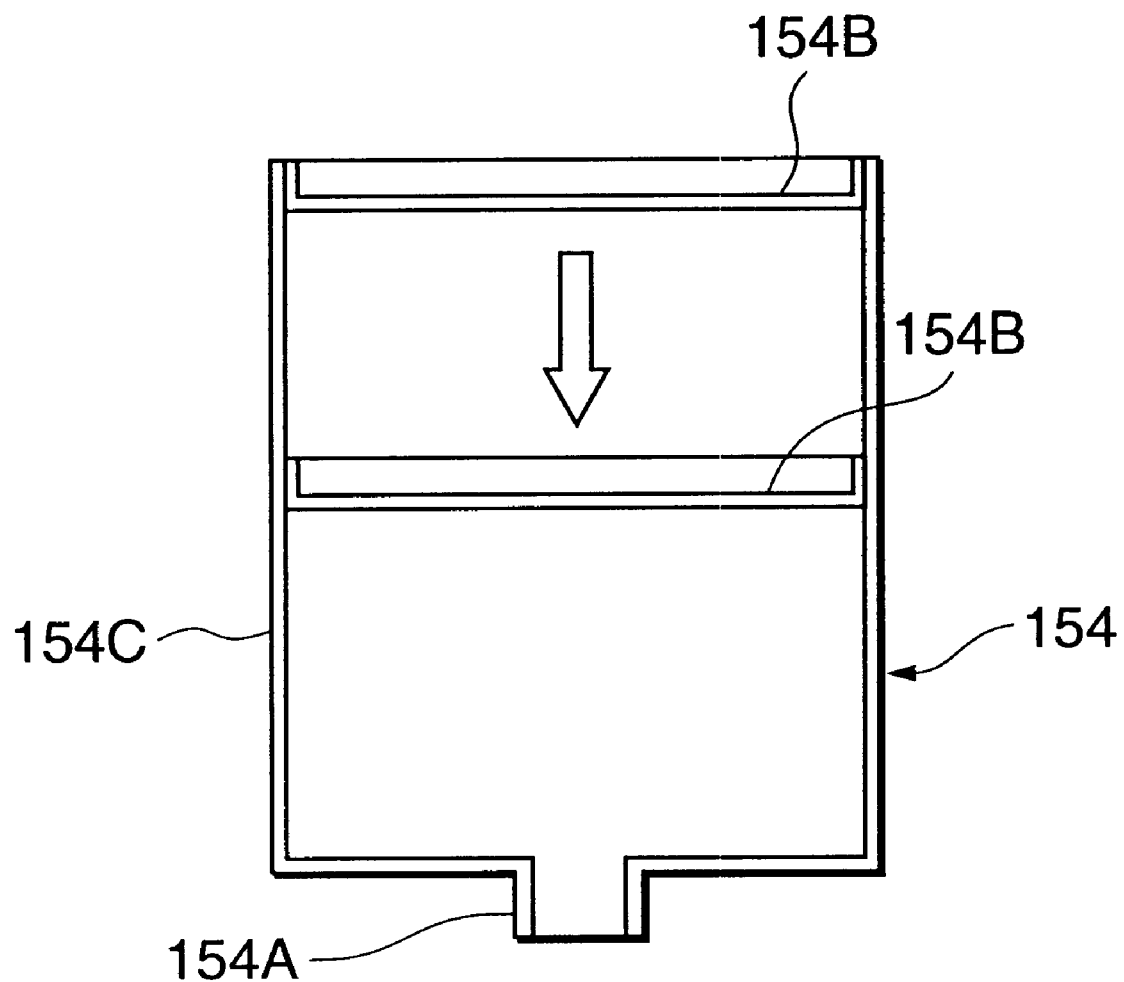
FIG. 22 is a sectional view showing another embodiment of a sauce container of the soft ice cream manufacture apparatus of FIG. 11.

Additionally, FIG. 22 shows another embodiment of the sauce container 154. In this case, a main body 154C of the sauce container 154 exhibits a cylindrical shape provided with a smooth inner wall, and an extraction port 154A is formed in the main body 154C. Moreover, a bottom wall 154B positioned opposite to the extraction port 154A can move toward the extraction port 154A in a close abutment state on the inner wall of the main body 154C. By using the sauce container 154 to press the bottom wall 154B toward the extraction port 154A by the piston 159, substantially all the sauce in the container can thoroughly be extracted.

Additionally, in the above-described embodiment two exits 132 are formed in the star-shaped adapter 119, but this is not limited, and one or three or more exits may be formed. Moreover, the sauce is not limited to the strawberry jam in the embodiment, and blueberry jam, apricot jam, chocolate, and the like are effective.

Possibility of Industrial Utilization

As described above, according to the present invention, even the material poor in heat resistance whose properties are changed by the heating sterilization of the liquid soft ice cream mix contained in the mix tank and/or the material containing the acid component can be added to the soft ice cream, and the unique flavor of the material other than the soft ice cream mix, such as the strawberry jam and chocolate can sufficiently be tasted. Therefore, the bright appearance and new flavor can be added to the soft ice cream.

Moreover, according to the present invention, since there are provided: a cooling cylinder for using the stirrer to stir and cool the mix and manufacture the soft ice cream; the extraction passage for extracting the soft ice cream from the cooling cylinder; the plunger for opening/closing the extraction passage; the sauce passage for supplying the fluid topping sauce to the exit of the extraction passage; the sauce container for containing the sauce; the sauce pressurizing/feeding device for feeding with pressure the sauce to the sauce passage from the sauce container; and the sauce valve for opening/closing the sauce passage, so that the sauce is supplied to the exit part of the extraction passage through which the soft ice cream taken out of the cooling cylinder passes, and the sauce can be added to the surface along the soft ice cream flow.

Thereby, the unique sauce pattern is formed on the surface of the extracted soft ice cream flow, the desire for buying can be increased, and the customer can taste the unique flavor of the sauce along the soft ice cream flow.

Particularly, since the sauce passage for pressurizing/feeding the sauce to the extraction passage is provided with the sauce valve to open/close, the sauce passage is closed by the sauce valve in a case where no sauce is added, so that the sauce can securely be prevented from leaking.

Moreover, according to the present invention, since the above-described sauce valve of the soft ice cream manufacture apparatus operates with the opening/closing of the extraction passage by the plunger to open/close the sauce passage, it is unnecessary to separately operate the extraction of the soft ice cream and the addition of the sauce, and the operability is remarkably enhanced.

Furthermore, according to the present invention, since it can additionally be selected whether the sauce valve operates with the operation of the plunger or not, in addition to the enhancement of the operability, no trouble occurs in selling the soft ice cream with no sauce added thereto.

Additionally, according to the present invention, since the above-described sauce pressurizing/feeding device operates with the opening of the sauce valve to pressurize/feed the sauce to the sauce passage from the sauce container, during the opening of the sauce valve to add the sauce to the soft ice cream, the sauce pressurizing/feeding device automatically pressurizes/feeds the sauce to the sauce passage, so that the sauce can remarkably smoothly be supplied to the extraction passage.

Moreover, in addition to the above-described effect, since the present invention can be achieved by using the existing soft ice cream manufacture apparatus, changing the extraction nozzle and adding the sauce supply structure, the general-purpose properties are enhanced. Particularly, since the pressing device pushes the sauce to the sauce passage from the sauce container in the structure, the sauce supply can securely be achieved in the simplified structure.

Moreover, according to the present invention, since in the above-described structure the sauce valve is vertically movably disposed, closes the sauce passage in the lowered state, and opens the sauce passage by the upward movement, and the connecting arm for disconnectably connecting the sauce valve to the plunger is disposed, the plunger and sauce valve can be operated together or be disconnected from each other in the remarkably simple structure, so that the production cost can be reduced.

Furthermore, according to the present invention, since the above-described pressing device constantly applies the pilot pressure to the sauce container, and operates with the opening of the sauce valve to increase the pressing force, the sauce can quickly be added with the extraction of the soft ice cream. Moreover, when the sauce valve closes, the pressing force is lowered, so that the pressure applied to the sauce container is minimized, and the container can be prevented or inhibited from being ruptured.

Additionally, according to the present invention, since the above-described sauce container is constituted of the main body provided with the extraction port connected to the sauce passage, and the bottom wall disposed opposite to the extraction port so that the bottom wall can move toward the extraction port in the main body in the close abutment state on the inner wall of the main body, and the pressing device is constituted to press this bottom wall, the sauce in the sauce container can substantially completely be used up, economical efficiency is enhanced, and the sauce extraction by the pressing device is stabilized.

Moreover, according to the present invention, the above-described constitution is provided with the cylinder for charging the sauce container, the inner lid rotatably and movably supported to openably close the cylinder opening, the notch cut and directed to the movable direction of the inner lid from the edge of the inner lid on the non-supported side, and the stopper for stopping the rotation while the inner lid moves to the non-supported side, the extraction port of the sauce container is drawn from the notch, and the pressing device presses the bottom wall of the sauce container disposed opposite to the extraction port, so that the inner lid can be moved/rotated while the sauce container extraction port is drawn to open/close the cylinder opening, and the charging/changing operation of the sauce container is remarkably facilitated. Moreover, the stopper inhibits the inner lid moved to the non-supported side from rotating, and the sauce container can therefore be held without any problem even when the pressing force is applied by the pressing device.

What is claimed is:

1. A soft ice cream manufacture and dispensing apparatus for charging a flow of a cooled and semi-hardened soft fluid ice cream mix discharged from a discharge nozzle into a cup together with another fluid material so that the discharge shape is maintained as much as possible, the apparatus comprising:

a plunger disposed in a passage provided with a discharge nozzle in one end and through which the semi-hardened soft ice cream mix passes, said plunger including a tip end surface for engagement/disengagement with respect to said discharge nozzle to open/close said passage; and an adding device for one of continuously or intermittently adding a fluid material substantially not containing said soft ice cream mix and having a fluidity of substantially the same degree as that of said semi-hardened soft ice cream mix to the soft ice cream flow passing immediately before said discharge nozzle or through the discharge nozzle, said adding device comprising:
      an addition nozzle for adding the fluid material in the vicinity of the inner wall surface of the discharge nozzle through which the semi-hardened soft ice cream mix flow passes;
      a deformable container for containing said fluid material connected to said addition nozzle by a tube; and
      a pressing member for pressing said container to directly maintain the fluid material in said tube under pressure at all times so as to push out a predetermined amount of said fluid material through the tube to the addition nozzle during all of the time that said discharge nozzle is open.

2. The soft ice cream manufacture apparatus according to claim 1 wherein the discharge nozzle further comprises a plurality of addition nozzles.

3. The soft ice cream manufacture apparatus according to claim 1 wherein the fluid material adding device comprises:
   an addition nozzle formed along the axial direction of the plunger for adding the fluid material in the vicinity of the center of the discharge nozzle through which the semi-hardened soft ice cream mix flow passes.

4. The soft ice cream manufacture apparatus according to claim 1 wherein the discharge nozzle further comprises a cleaning nozzle for cleaning the inside of the discharge nozzle by hot water or water.

5. A soft ice cream manufacture and dispensing apparatus comprising:
   a cooling cylinder for stirring and cooling a mix by a stirrer to manufacture a soft ice cream;
   an extraction passage for extracting the soft ice cream from the cooling cylinder;
   a plunger for opening/closing the extraction passage;
   a sauce passage for supplying a fluid topping sauce to the exit part of said extraction passage;
   a deformable sauce container for containing sauce;
   a sauce pressurizing/feeding device for continuously pressing the deformable sauce container feeding the sauce to said sauce passage and pre-pressurizing the sauce in the sauce passage; and
   a sauce valve operating with said plunger for opening/closing said sauce passage to permit the pressurized sauce to flow to said extraction passage.

6. The soft ice cream manufacture apparatus according to claim 5 wherein the sauce valve operates with the opening/closing of the extraction passage by the plunger to open/close the sauce passage.

7. The soft ice cream manufacture apparatus according to claim 6 wherein the sauce value is selectively operated with or without the operation of the plunger.

8. The soft ice cream manufacture apparatus according to claim 5 wherein the sauce pressurizing/feeding device operates with the opening of the sauce valve to pressurize/feed the sauce to the sauce passage from the sauce container.

9. A soft ice cream manufacture and dispensing apparatus for manufacturing a soft ice cream, the apparatus comprising:
   a cooling cylinder provided with an extraction path for extracting said soft ice cream in a front end;
   an extraction passage provided with the exit of said extraction path formed in an inner wall surface and an extraction nozzle for taking out said extracted soft ice cream in a lower end;
   a plunger, vertically movably disposed in the extraction passage, for closing said extraction nozzle in a lowered state and opening said extraction path exit when moving upward apart from said extraction nozzle;
   a sauce passage for supplying a fluid topping sauce to the extraction passage;
   a deformable sauce container for containing sauce;
   a sauce pressurizing/feeding device for continuously pressing the deformable sauce container feeding the sauce to said sauce passage and pre-pressurizing the sauce in said sauce passage; and
   a sauce valve for opening/closing said sauce passage.

10. The soft ice cream manufacture apparatus according to claim 9 wherein the sauce valve is vertically movably disposed to close the sauce passage in the lowered state and to open said sauce passage by the upward movement, and a connecting arm for disconnectably connecting the sauce valve to the plunger is disposed.

11. The soft ice cream manufacture apparatus according to claim 10 wherein the pressing device constantly applies a pilot pressure to the sauce container, operates with the opening of the sauce valve to increase a pressing force, and lowers the pressing force when said sauce valve closes.

12. The soft ice cream manufacture apparatus according to claim 9 wherein the sauce container comprises a main body provided with an extraction port connected to the sauce passage, and a bottom wall disposed opposite to said extraction port so that the bottom wall can move toward said extraction port in the main body in a close abutment state on the inner wall of said main body, and the pressing device presses the bottom wall.

13. A soft ice cream manufacture apparatus for manufacturing a soft ice cream, the apparatus comprising:

a cooling cylinder provided with an extraction path for extracting said soft ice cream in a front end;

an extraction passage provided with the exit of said extraction path formed in an inner wall surface and an extraction nozzle for taking out said extracted soft ice cream in a lower end;

a plunger, vertically movably disposed in the extraction passage, for closing said extraction nozzle in a lowered state and opening said extraction path exit when moving upward apart from said extraction nozzle;

a cylinder for charging the sauce container;

an inner lid, rotatably and movably supported, for openably closing or opening of said cylinder;

a notch directed and cut to the movable direction of the inner lid from the edge of the inner lid on a non-supported side; and a stopper for stopping rotation while the inner lid moves to the non-supported side, so that the extraction port of the sauce container is drawn from said notch, and the pressing device presses the bottom wall of the sauce container disposed opposite to the extraction port.

\* \* \* \* \*